(12) United States Patent
Zheludev et al.

(10) Patent No.: US 12,211,241 B2
(45) Date of Patent: Jan. 28, 2025

(54) METHOD AND APPARATUS FOR SUPER-RESOLUTION OPTICAL IMAGING

(71) Applicants: University of Southampton, Southampton (GB); Nanyang Technological University, Singapore (SG)

(72) Inventors: Nikolay Ivanovich Zheludev, Southampton (GB); Guanghui Yuan, Singapore (SG); Nikitas Papasimakis, Southampton (GB); Vassily Savinov, Southampton (GB)

(73) Assignees: University of Southampton, Southampton (GB); Nanyang Technological University, Singapore (SG)

( * ) Notice: Subject to any disclaimer, the term of this patent is extended or adjusted under 35 U.S.C. 154(b) by 368 days.

(21) Appl. No.: 17/618,607

(22) PCT Filed: Jun. 12, 2020

(86) PCT No.: PCT/GB2020/051423
§ 371 (c)(1),
(2) Date: Dec. 13, 2021

(87) PCT Pub. No.: WO2020/249964
PCT Pub. Date: Dec. 17, 2020

(65) Prior Publication Data
US 2022/0262087 A1    Aug. 18, 2022

(30) Foreign Application Priority Data
Jun. 13, 2019  (GB) .................................... 1908500

(51) Int. Cl.
*G06V 10/145*    (2022.01)
*G06V 10/147*    (2022.01)
(Continued)

(52) U.S. Cl.
CPC .......... *G06V 10/145* (2022.01); *G06V 10/147* (2022.01); *G06V 10/774* (2022.01);
(Continued)

(58) Field of Classification Search
CPC .. G06V 10/145; G06V 10/147; G06V 10/774; G06V 10/82; G06V 20/66; G06V 10/16; G06F 18/2413
(Continued)

(56) References Cited

U.S. PATENT DOCUMENTS 9,606,415 B2     3/2017   Zheludev et al.
2013/0235180 A1*  9/2013   Rogers ............... G02B 21/0084
                                                            348/79

FOREIGN PATENT DOCUMENTS

CN     108037508 A     5/2018
WO    2008/00993 A1    1/2008

OTHER PUBLICATIONS

Gang Chen et al. ("Super oscillation: from physics to optical applications") (Year: 2019).*
(Continued)

*Primary Examiner* — Stephen P Coleman
(74) *Attorney, Agent, or Firm* — Renner, Otto, Boisselle & Sklar, LLP.

(57) ABSTRACT

A method of imaging comprises: generating a superoscillatory field from coherent electromagnetic radiation; placing an object in the superoscillatory field; detecting one or more intensity distributions of the superoscillatory field scattered by the object; and determining at least one characteristic of the object from the one or more intensity distributions.

14 Claims, 13 Drawing Sheets

(51) Int. Cl.
G06V 10/774 (2022.01)
G06V 10/82 (2022.01)
G06V 20/66 (2022.01)
G06V 10/10 (2022.01)

(52) U.S. Cl.
CPC .............. *G06V 10/82* (2022.01); *G06V 20/66* (2022.01); *G06V 10/16* (2022.01)

(58) Field of Classification Search
USPC ........................................................ 382/157
See application file for complete search history.

(56) References Cited

OTHER PUBLICATIONS

Z. Bomzon, G. Biener, V. Kleiner, E. Hasman, "Space-Variant Pancharatnam-Berry Phase Optical Elements with Computer Generated Subwavelength Gratings", Opt. Lett. 27, 1141-1143 (2012).
D. Lin, P. Fan, E. Hasman, M.L. Brongersma, "Dielectric Gradient Metasurface Optical Elements", Science 345, 298-302 (2014).
Edward T.F. Rogers, Nikolay I. Zheludev, Optical Super-Oscillations: Sub-Wavelength Light Focusing and Super-Resolution Imaging, Journal of Optics, Institute of Physics Publishing, Bristol GB, vol. 15, No. 9, p. 94008, Sep. 10, 2013.
K.S. Rogers, K.N. Bourdakos, G.H. Yuan, S. Mahajan, E.T.F. Rogers, "Optimising Superoscillatory Spots for Far-Field Super-Resolution Imaging", Opt. Express 26(7), 8085-8112 (2018).
G.H. Yuan, S. Vezzoli, C. Altuzarra, E.T.F. Rogers, C. Soci, N.I. Zheludev, "Quantum Super-Oscillation of A Single Photon", Light Sci. Appl. 5, e16127 (2016).

E.T.F. Rogers, J. Lindberg, T. Roy, S. Savo, J.E. Chad, M.R. Dennis, N.I. Zheludev, "A Super-Oscillatory Lens Optical Microscope for Subwavelength Imaging", Nat. Mater. 11, 432 (2012).
G.H. Yuan, E.T.F. Rogers, N.I. Zheludev, "'Plasmonics' in Free Space: Observation of Giant Wavevectors, Vortices and Energy Backflow in Superoscillatory Optical Fields", Light Sci. Appl. 8, 2 (2019).
H.N. Chapman and K.A. Nugent, "Coherent Lensless X-Ray Imaging", DOI: 10.1038/nphoton.2010.240.
G.J. Williams, H.M. Quiney, B.B. Dhal, C.Q. Tran, K.A. Nugent, A.G. Peele, D. Paterson, M.D. De Jonge, "Fresnel Coherent Diffractive Imaging", Phys. Rev. Lett. 97, 025506 (2006).
International Search Report and Written Opinion of the International Searching Authority for corresponding International Patent Application No. PCT/GB2020/051423, mailed Sep. 7, 2020.
Gang Chen, et al., "Superoscillation: From Physics to Optical Applications", Light: Science & Applications, vol. 8, No. 1., p. 11, Jun. 12, 2019.
G. H. Yuan, N. Zheludev, "Gigantic Wavevectors and Energy Backflow in the Focus of a Super-oscillatory Lens," in 2017 European Conference on Lasers and Electro-Optics and European Quantum Electronics Conference, p. 1, (Optical Society of America, 2017), Jun. 25, 2017.
Zhenyu Long, et al., "Terahertz Image Super-Resolution Based on a Deep Convolutional Neural Network", Applied Optics, vol. 58, No. 10, pp. 2731-2735, Apr. 1, 2019, US.
Ammari Habib, et al., "A Mathematical Theory of Super-Resolution by Using a System of Sub-Wavelength Helmholtz Resonators", Communications in Mathematical Physics, Springer Verlag, Heidelberg, DE, vol. 337, No. 1, pp. 337-428 Feb. 14, 2015.
Search Report under Section 17 for corresponding GB Application No. 1908500.0, mailed Dec. 11, 2019.

\* cited by examiner

METHOD AND APPARATUS FOR SUPER-RESOLUTION OPTICAL IMAGING

This application is a national phase of International Application No. PCT/GB2020/051423 filed Jun. 12, 2020, which claims priority to United Kingdom Application No. 1908500.0, filed Jun. 13, 2019, the entire disclosures of which are hereby incorporated by reference.

BACKGROUND OF THE INVENTION

The present invention relates to methods and apparatus for super-resolution optical imaging.

Conventional imaging techniques and techniques for light-based metrology (which is valuable owing to the ability to make non-contact measurements) have a spatial resolution limited to around half the wavelength of the light used to interrogate the object to be imaged or measured. This value arises from the diffraction limit, and the related Abbe-Rayleigh rule, which dictate that a conventional lens is unable to focus light propagating in free space to a spot smaller than half the wavelength. This is clearly highly limiting for basic metrology techniques in which an observation microscope is used to compare an object with a measurement scale (ruler), and also applies to more complex approaches such as the use of laser interferometers for displacement measurements. Interferometry, while offering high accuracy, also has drawbacks including the need for high stability and a dependence on bulk optical components that prevents miniaturization. While various techniques can improve the positioning and sharpness of the interference peaks, the resolution is still determined by the free space optical wavelength. Hence, imaging and metrology on the nanometre scale (nanoscale) is difficult.

Early attempts to overcome the Abbe-Rayleigh diffraction limit for imaging of microscale and nanoscale objects relied on recording the evanescent field of an object, in techniques such as contact photography and scanning near-field imaging (SNOM). These near-field techniques can provide nanoscale resolution, but capturing evanescent fields requires a probe (or photosensitive material) to be in the immediate proximity of the object, so the techniques cannot be used to image inside cells or silicon chips, for example. More recently, other techniques have been proposed to reconstruct and capture evanescent fields including the far-field Veselago-Pendry "super-lens", which uses a slab of negative refractive index metamaterial as a lens to image evanescent waves from an object onto a camera. This approach, however, faces substantial technological challenges in its implementation in optics, and has not yet been developed as a practical imaging technique.

For biological applications, super-resolution imaging is dominated by the powerful methods of stimulated emission depletion (STED) and single-molecule localization (SML) microscopies. These are far-field techniques which have demonstrated the possibility of nanoscale imaging without capturing evanescent fields, which decay over a scale of about one wavelength away from the object and can therefore be problematic to detect. These approaches have become widely used, but also have limitations. Both STED and some of the SML techniques use an intense beam to excite, deplete or bleach fluorophores in a sample, but this can cause damage, known as phototoxicity, by stressing and eventually killing living samples. SML is also inherently slow, requiring thousands of images to be captured to build a single high-resolution image. Moreover, STED and SML require fluorescent reporters within the sample. This is usually achieved by genetic modification or antibody-mediated labelling with fluorescent dyes or quantum dots, but the labels are known to change the behaviour of the molecules or biological systems being studied. Furthermore, they cannot be applied to solid artificial nanostructures, such as silicon chips.

Accordingly, super-resolution techniques for imaging and metrology that are more universally applicable and less complex to implement are of significant interest.

SUMMARY OF THE INVENTION

Aspects and embodiments are set out in the appended claims.

According to a first aspect of certain embodiments described herein, there is provided a method of imaging comprising: generating a superoscillatory field from coherent electromagnetic radiation; placing an object in the superoscillatory field; detecting one or more intensity distributions of the superoscillatory field scattered by the object; and determining at least one characteristic of the object from the one or more intensity distributions.

According to a second aspect of certain embodiments described herein, there is provided an apparatus configured to implement a method according to the first aspect.

According to a third aspect of certain embodiments described herein, there is provided an apparatus for imaging an object comprising: a superoscillatory field generator configured to generate a superoscillatory field; a detector configured to detect an intensity distribution of the superoscillatory field; and a processor configured to receive intensity distributions, detected by the detector, of the superoscillatory field scattered by an object placed in the superoscillatory field, and determine at least one characteristic of the object from one or more of the intensity distributions.

According to a fourth aspect of certain embodiments described herein, there is provided a storage medium storing software comprising a neural network trained with a plurality of intensity distributions of a scattered superoscillatory field, each intensity distribution corresponding to a different object or different object position or different object orientation for objects with one or more known characteristics positioned in the superoscillatory field to scatter the superoscillatory field, the neural network configured to deduce one or more unknown characteristics of an object from one or more intensity distributions of the superoscillatory field detected with the object positioned in the superoscillatory field.

According to a fifth aspect of certain embodiments described herein, there is provided a storage medium storing software comprising a computer program configured to: receive, for one or more positions of an object placed in a superoscillatory field, a plurality of detected intensity distributions of the superoscillatory field scattered by the object, each intensity distribution being for a different polarisation state of coherent electromagnetic radiation from which the superoscillatory field is generated; retrieve a phase distribution of the scattered superoscillatory field from the or each plurality of detected intensity distributions; and determine a reconstruction of at least part of the object from the detected intensity distributions and retrieved phase distributions.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods and apparatus may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
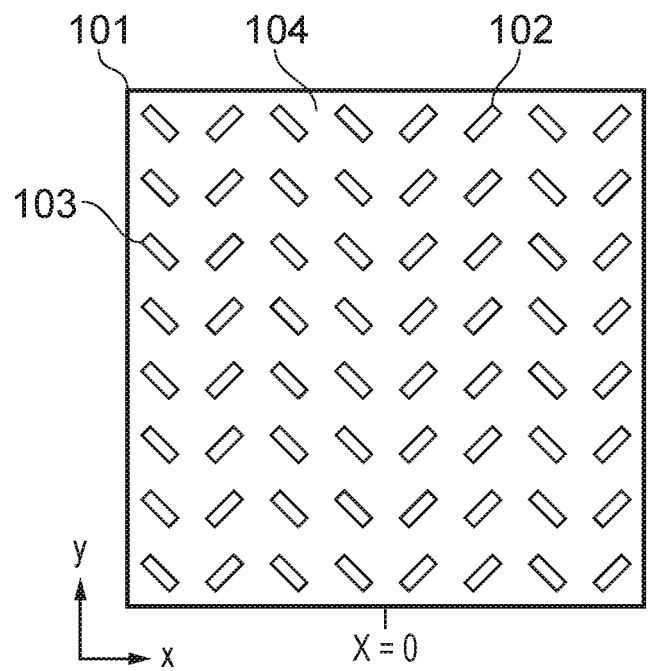
FIG. 1 shows a schematic plan view of a first example metasurface suitable for generating a superoscillatory field.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The field of plasmonics relates to coupled electromagnetic states of light and free electrons in metals. Light can be evanescently confined near the surface of nanoparticles and other objects structured with features on the nanoscale, giving a field with a detailed spatial spectrum which can change very rapidly and include high spatial frequencies. While these characteristics enable some high resolution imaging techniques, it is necessary to detect the optical field very close to the object, which necessarily restricts use of these techniques. The evanescent component of the field decays rapidly with distance from the nanostructure (within a few free-space wavelengths of the optical radiation), and does not propagate into free space. The term "nanoscale" indicates objects or features with dimensions below about 1 μm, in other words, 1000 nm or smaller.

However, it has been found that similarly detailed spatial spectra can be produced in the far field, remote from a nanostructured medium, using diffraction of optical plane waves. Under certain bandwidth-limited conditions, the spatial spectrum or distribution of an optical field can locally oscillate much faster than the highest Fourier component, and the local Fourier transform can have both positive and negative values. This is known as superoscillation, which is applicable generally to wave functions, and is not limited to light. In the context of optics, a combination of several plane waves, for instance resulting from diffraction of a single plane wave on a nanostructure, can generate, in free space far from the nanostructure, a so-called superoscillatory field which contains highly localised zones of light (hot spots) with dimensions beyond the Abbe-Rayleigh diffraction limit and/or minute regions of rapidly changing phase and corresponding very high values of the local wavevector.

The present invention recognises that these features can be utilised for applications including metrology and imaging.

Herein, the terms such as "superoscillatory field", "superoscillatory optical field" and "superoscillatory wave" are used to refer an optical field (illuminated region) with the above-noted features, i.e. one or more localised zones of increased or high light intensity, also known as hot-spots, and/or one or more localised regions of rapid phase change, also known as phase singularities, where these zones and regions are sized below or substantially below or significantly below the diffraction limit of half the free space wavelength, $\lambda/2$, of light used to generate the field. The field contains features of intensity and/or features of phase and or features of wavevector which exist and/or change over spatial dimensions on this sub-wavelength scale. As will be described further below, the field may be a direct or non-interferometric superoscillatory field, or an interferometric superoscillatory field created by the interference of a direct superoscillatory field and a plane wave. Unless specified or clear from the context, the above-noted terms can refer to either of these alternatives.

For some such applications, the intensity of a superoscillatory optical field is useful, and this can be detected directly from the field with suitable optical equipment. For other purposes, the phase may be of interest. In order to access the phase of a superoscillatory optical field, it is possible to utilise an interferometric arrangement. Interferometry requires two waves to interact and the resulting combination of the two waves is an interference pattern, in which each point is the sum of the complex amplitudes of the two waves at that location, which may add or cancel. Typically, one wave is a wave under investigation, carrying information of interest, and the other is a reference wave. Phase information can be extracted from an intensity measurement of the interference pattern, which may be referred to herein for convenience as an interferometric superoscillatory field.

Superoscillatory fields can be generated by passing an optical plane wave through a nanostructured or metamaterial mask, also referred to as a metasurface, which is a mask patterned on the nanoscale with features of a subwavelength size. An intensity mask or intensity metasurface comprises a thin opaque film of a material such as metal or semiconductor with a pattern of precisely sized and oriented nanoscale apertures that transmit and modify the incident plane wave to generate a superoscillatory field. A phase mask or phase metasurface comprises a thin film of a transparent material patterned with bumps or protrusions (regions of variable thickness). Light passing through the mask experiences different phase retardation according to the thickness of the material, again resulting in a superoscillatory field. A combined metasurface or mask is configured to control the transmission of incident light in both intensity and phase.

If an interferometric superoscillatory field is needed, the two waves required for interference can be created using certain formats of intensity metasurface. Such an example is an intensity metasurface in the form of a planar mask or metasurface, fabricated in a thin opaque film by a nanofabrication technique such as focused ion beam milling or electron beam lithography. The metasurface is patterned with a plurality of identically sized and shaped slits dimensioned on a sub-wavelength scale, to cause scattering and diffraction of incident light. The slits may be arranged in a regular array of rows and columns, equally spaced from one another. For the purposes of description, the metasurface can be considered to occupy an x-y plane, with the rows of slits aligned along the x-direction (x-axis) and the columns of slits aligned along the y-direction (y-axis). Each slit is oriented at either +45° or −45° with respect to the x-axis. Note, however, that other arrangements of slits are possible, such as random or concentric; the pattern can be selected to control the structure of the superoscillatory field.

In a first example, configured to generate a superoscillatory field patterned in one dimension only within a plane parallel to the plane of the metasurface, the pattern of slits has translational symmetry in the y-direction. In other words, within a column every slit has the same orientation. Along a row, in the x-direction, the orientation of the slits is varied so as to achieve multiple diffraction of the incident light in order to create a superoscillatory field in free space on the transmission side of the mask, the field containing phase singularities and/or zones of strong light localisation. Such arrangements of slits allow the metasurface to work similarly to a cylindrical lens which focuses light into a line. Such a metasurface can be considered to operate in one dimension as regards generation of the superoscillatory field at a propagation distance z from the plane of the metasurface.

FIG. 1 shows a plan view of an example intensity metasurface in which slits with the same spacing either side of x=0 have opposite orientations. The metasurface 101 comprises an array of slits formed in a thin film 104, some slits 102 oriented at +45° and some slits 103 oriented at −45°. The array of slits hence has mirror symmetry about the x=0 line. This is merely an example of slit orientation, however.

The slit dimensions and the film thickness can be optimised for the intended wavelength of the incident optical plane wave. The period of the slit spacing or separation (spacing of adjacent slits) is preferably less than the intended wavelength so that only the zeroth diffraction order is generated for light propagating through the metasurface with the polarisation state of the incident wave. Light propagating with the orthogonal polarisation generates the superoscillatory field; this is described further below. Hence, this arrangement enables generation of a reference plane wave for the desired interference, together with the superoscillatory field. Also, the described arrangement of slits creates a metasurface or mask which is polarisation-sensitive, in that the characteristics and features of the field on the transmission or output side of the mask depend on the polarisation state of the plane wave incident on the input side of the mask. As an example only, a mask may measure 40 μm by 40 μm, and comprise 100 rows and 100 columns of slits. Typical slit dimensions are 400 nm long and 50 nm wide. As an example, the metasurface may be a Pancharatnam-Berry phase metasurface [1, 2].

Figure 2:
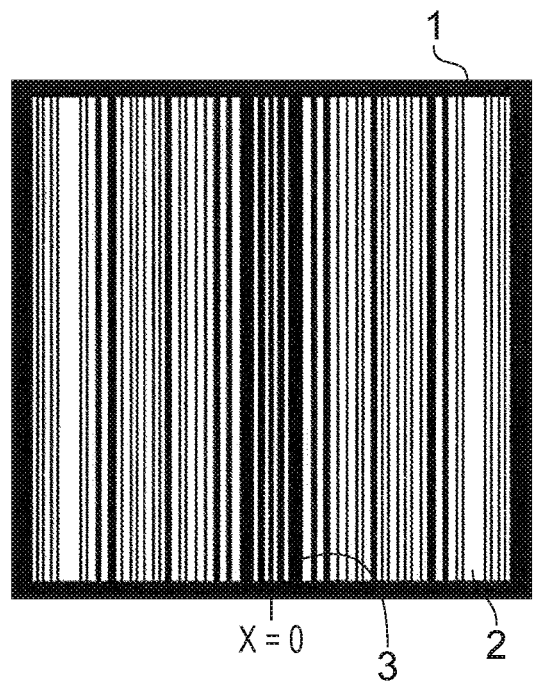
FIG. 2 shows a schematic plan view of a second example metasurface suitable for generating a superoscillatory field.

FIG. 2 shows an example of a different format of metasurface suitable for generation of a superoscillatory field. It comprises a transmissive film 1 patterned with a complex aperiodic grating comprising nanoscale vertical opaque stripes. The transmissive (white) portions 2 can be considered to have unitary transmission at the incident wavelength (i.e. no attenuation of the light) and the opaque (black) portions 3 can be considered to have zero transmission. Accordingly, the mask is an intensity mask. The stripes are configured to have various thicknesses and separations, but are, in this example, reflected either side of the central, x=0, line. As an example only, a mask of this type may measure 64 μm by 64 μm. This arrangement gives some similarity with the FIG. 1 mask, in that the metasurface behaves similarly to a cylindrical lens by generating a superoscillatory field that has intensity variation in one direction only. However, unlike the FIG. 1 mask patterned with a grid of angled slits, it does not generate a plane wave in addition to the superoscillatory field, so cannot be used for applications requiring an interferometric superoscillatory field. However, a mask of this type is suitable when only intensity measurements are required, with no need for phase information.

Accordingly, a range of masks or metasurfaces are available for the generation of superoscillatory fields, with and without the capability to generate an interferometric field. Masks able to produce an interferometric field can be termed interferometric masks. Further information regarding metasurface design and fabrication can be found in [3, 4, 5, 6, 7].

Returning to an interferometric intensity mask of the FIG. 1 type, patterned with slits, in use, the mask, which we can consider to be arranged in the x-y plane, is illuminated from one side (input side) with an incident plane wave propagating in the z-direction, with a known polarisation. The orientation of the slits affects the outcome of light propagating through the mask to arrive at the output or transmission side, depending on the incident polarisation orientation. For example, if the incident light is polarised along the x-axis, the light transmitted by the slits, which are oriented at +45° and −45° to the x-axis, will be y-polarised light with a π phase difference. This transmitted light forms the desired superoscillatory field, which is in cross-polarisation to the incident field. Hence, in this example and orientation, the pattern of slits works as a binary phase mask for y-polarisation. The part of the transmitted field which is co-polarised with the incident wave, in this case the x-polarisation, has propagated through the mask as a plane wave, with some attenuation. Indeed, when the metasurface is illuminated with x-polarised light, the phase of x-polarised transmitted light is independent of the slit orientation, and the x-polarised light remains as a plane wave because the period of the slits is sub-wavelength and only the zeroth diffraction order is generated. Similarly, if the mask is illuminated with y-polarised light, the superoscillatory field pattern is created in the x-polarisation while light passing through the metasurface as a plane wave has y-polarisation; now the slits are operating as a binary phase grating for x-polarisation. Hence the mask is polarisation-sensitive, and only creates a superoscillatory field in cross-polarisation with the incident wave. At the same time, however, part of the transmitted light forms a plane wave (in co-polarisation with the incident wave). This provides the two waves required for interferometry.

Figure 3:
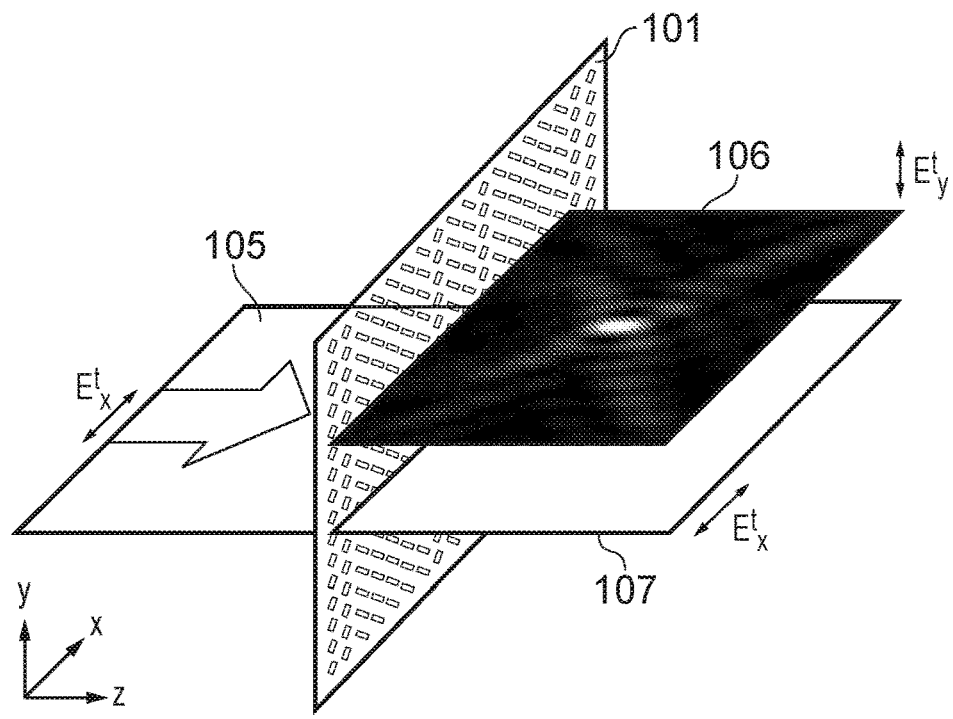
FIG. 3 shows a schematic perspective representation of an interferometric superoscillatory field generated by transmission of a plane wave through a metasurface, presented as a cross-section perpendicular to the metasurface.

FIG. 3 shows a highly schematic representation of the result of illuminating a mask patterned according to the FIG. 1 example. Incident light 105 propagating along the z-direction and polarised in the x-direction, such that its transverse electric field is $E^t_x$, passes through the mask 101 to create a superoscillatory field 106 with a y-polarisation, and a plane wave field 107 with a x-polarisation. This can act as a reference field to interfere with the superoscillatory field 106.

While FIG. 3 shows the two transmitted fields 106, 107 as displaced from one another, this is for ease of illustration only. In reality the superoscillatory field 106 and the reference field 107 are coincident (overlapping) in space, and hence interfere with each other. Hence, the metasurface 101 itself inherently by its transmission operation generates the two fields or waves needed for the desired interferometry. Additionally, the two fields are created in a particularly attractive way, since the wavefronts are mutually stable and physically aligned, having been derived from the same original wavefront by transmission through the same metasurface. Hence, alignment problems typical of conventional interferometry arrangements are moot.

Upon transmission through the metasurface, the x-polarised field 107 (continuing with the same example orientation) suffers the same phase retardation regardless of the orientation of the slits and with the same intensity attenuation at all points due to the energy transfer into the cross-polarised field. Therefore, for the x-polarised field 107 the metasurface has acted as a homogeneous sub-wavelength grating of limited size (aperture), producing only a zero-order diffraction field in the form of a plane wave. In reality, the x-polarised light 107 does show some variation from a plane wave due to aperture diffraction at the edges of the metasurface. Nevertheless, it is a good reference field for interferometry as it has a phase close to that of a plane wave and a well-defined, easy to measure intensity profile with no zeros.

The superoscillatory field available for observation is therefore the interferometric output of the metasurface, generated as an inherent feature of its operation, and comprising the interference of the superoscillatory field with the reference field. Use of the term "superoscillatory field" herein can refer to either the pure diffracted superoscillatory wavefront, or the interferometric wavefront which is the detectable output. The superoscillatory field can be observed and recorded by measuring the intensity distribution in the x-y plane or along the x-direction (or in some cases the y-direction) for different distances from the output side or face of the metasurface, in other words different values of z. The metasurface is considered herein to be located at z=0. For example, to obtain a map of the superoscillatory field in the x-z plane, so as to allow a study of the change in features with propagation distance, the intensity distribution can be measured along the x-direction for multiple z positions, and the results combined to produce an intensity map.

Figure 4:
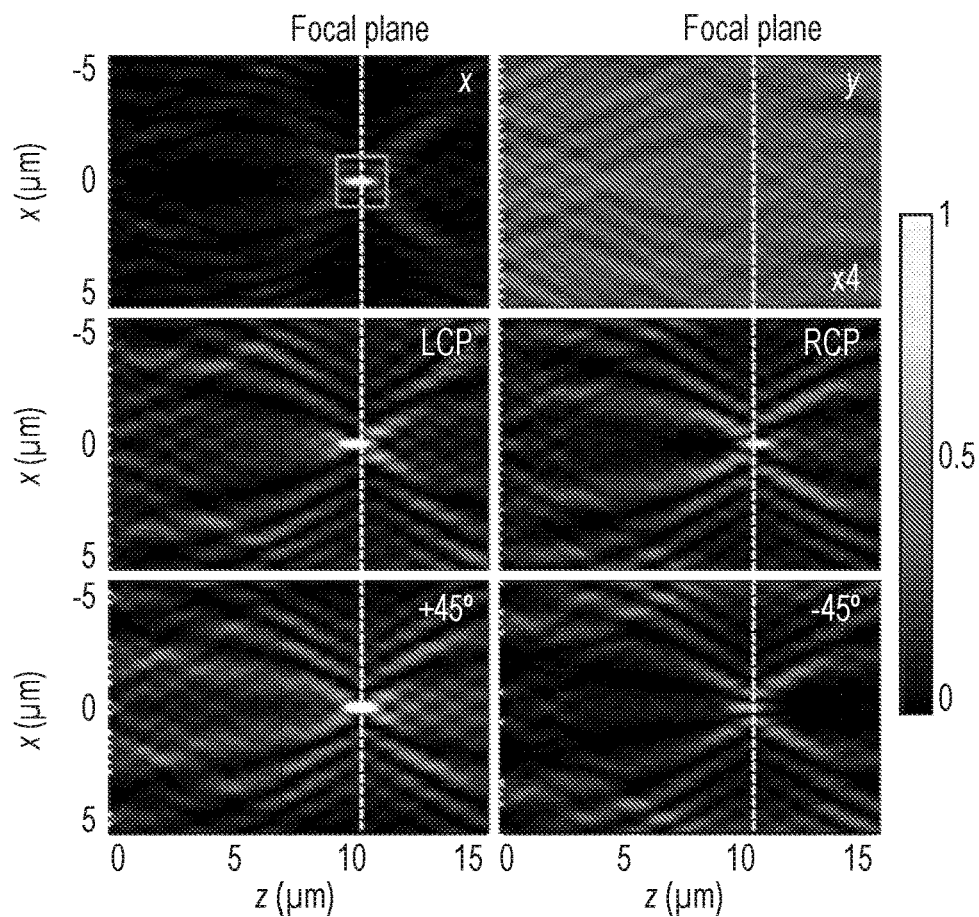
FIG. 4 shows a set of computer-generated intensity distributions of superoscillatory fields produced from different incident plane wave polarisations, presented as a cross-section perpendicular to the metasurface.

FIG. 4 shows computer simulated results (obtained using a finite difference time domain (FDTD) calculation) of such an x-z plane map or cross-section of intensity measurements of the y-polarised component of the interferometric wavefront (also referred to as a diffraction pattern) generated for different incident polarisation states. The different states comprise x-polarisation, y-polarisation, left circular polarisation (LCP), right circular polarisation (RCP), +45° linear polarisation and −45° linear polarisation. The polarisation states are indicated in the top right corner of each intensity map, together with the dimensions in the x and z directions. The incident light had a wavelength λ of 800 nm. Polarisation states oriented at ±45° are applicable to the example metasurfaces with slits having this orientation; for other slit configurations, pairs of orthogonal linear polarisations at different orientations will be appropriate.

It can be seen from FIG. 4 that when the incident light is x-polarised, the y-polarised component of the diffracted wave contains a superoscillatory hotspot (similar to a focus) at a distance of 10 μm from the metasurface. This is marked by a box in FIG. 4. The hotspot or focal spot or point has a full width at half maximum (FWHM) of 0.42λ, which is well below the Abbe-Rayleigh diffraction limit given by λ/2NA=0.56λ for a cylindrical lens with a numerical aperture corresponding to the experimental situation of NA=0.89 (20 μm size lens with a focal distance of 10 μm). This small feature size indicates the usefulness of superoscillatory fields for improving the resolution of optical metrology and imaging.

Under y-polarised illumination, the y-component of the diffracted wave is the reference field used for the interferometry. For an infinitely long metasurface (diffraction grating), it would show no structural features, while the minor variations in the transmission amplitude seen in FIG. 4 are due to the aperture effects of the finite metasurface. With a circularly polarised incident wave (LCP and RCP), the y-component of the diffraction patterns originates from the interference of the superoscillatory field and the reference wave with an initial phase difference of $\pm\pi/2$ between them, depending on the handedness of the incident polarisation. Similarly, for the incident linear polarisation at $\pm 45°$, the y-component has a phase difference between the superoscillatory and reference fields of 0 and $\pi$ respectively.

These simulated results have been replicated experimentally, using an 800 nm wavelength diode laser as an optical source, and mapping the intensity of the interference pattern with a CMOS camera placed on a nanometric translation stage and equipped with a ×500 magnification optical system.

Figure 5:
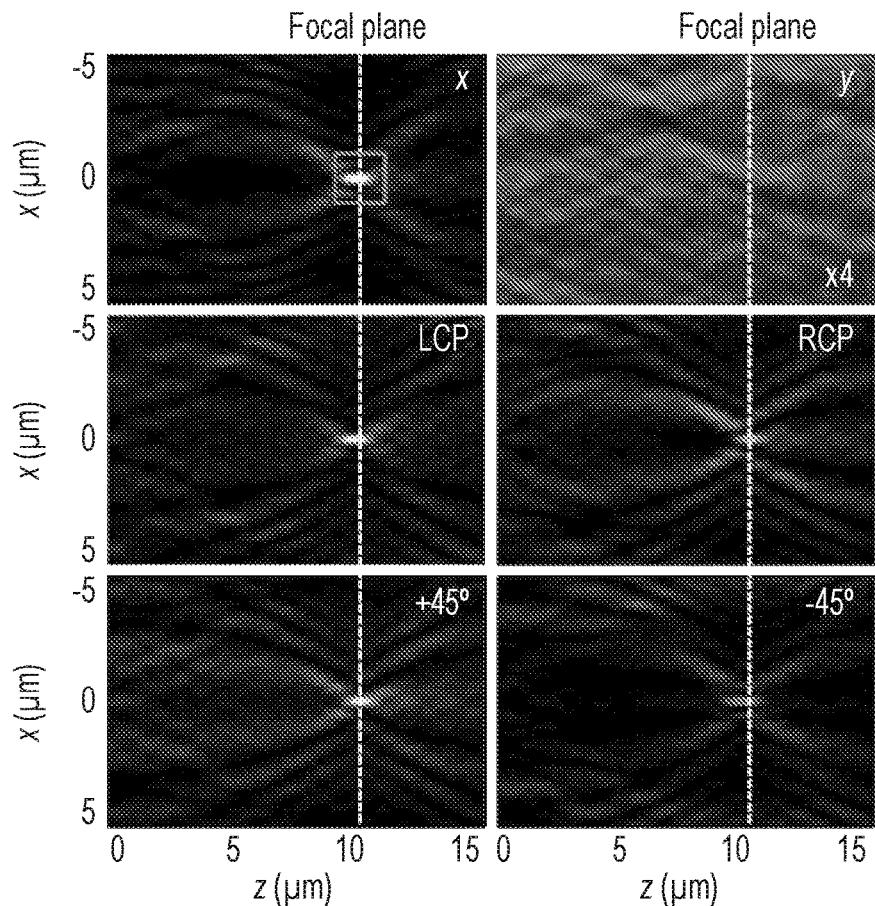
FIG. 5 shows a set of detected intensity distributions of superoscillatory fields generated experimentally under the same conditions as the computer generation used to produce the FIG. 4 intensity distributions.

FIG. 5 shows the experimental results, indicating good correspondence with the computer simulated results of FIG. 4. In particular, the superoscillatory hotspot is observed at z=10 µm, and its FWHM is measured to be 0.43λ, roughly only a 2% difference from the computed size of the hotspot. Hence, the actual superoscillatory field includes spatial features sized below the Abbe-Rayleigh diffraction limit, and spaced apart from the surface of the mask, in the far field. These features indicate the applicability of superoscillatory fields for super-resolution techniques.

Also, note the use of the CMOS camera and ×500 magnification in obtaining the experimental results. The resolution of such a detector depends on its pixel size and will be, of itself, insufficient for direct mapping and exploration of the spatial features of the superoscillatory field. However, the superoscillatory field is formed by interfering optical waves propagating in free space. This means that it can be imaged by magnification with a conventional lens or lenses (or equivalently, one or more mirrors) without loss of resolution of the spatial features, in order to enlarge the field for detection by a conventional imaging or optical detection apparatus, such as the aforementioned CMOS camera. This is a further benefit of the proposed use of superoscillatory fields for far field imaging and metrology.

Indeed, the ability to image the free-space superoscillatory field at any magnification level and without any loss of resolution is a significant feature for the super-resolution techniques disclosed herein. It gives straightforward access for the purpose of light detection to the extremely small scale features of these fields, allowing them to be utilised in a range of applications. This attractive characteristic is applicable to both interferometric and non-interferometric superoscillatory fields.

A number of distinguishing characteristics of a superoscillatory field can be utilised for imaging and/or metrology, and these will now be explained in more detail.

Figure 6:
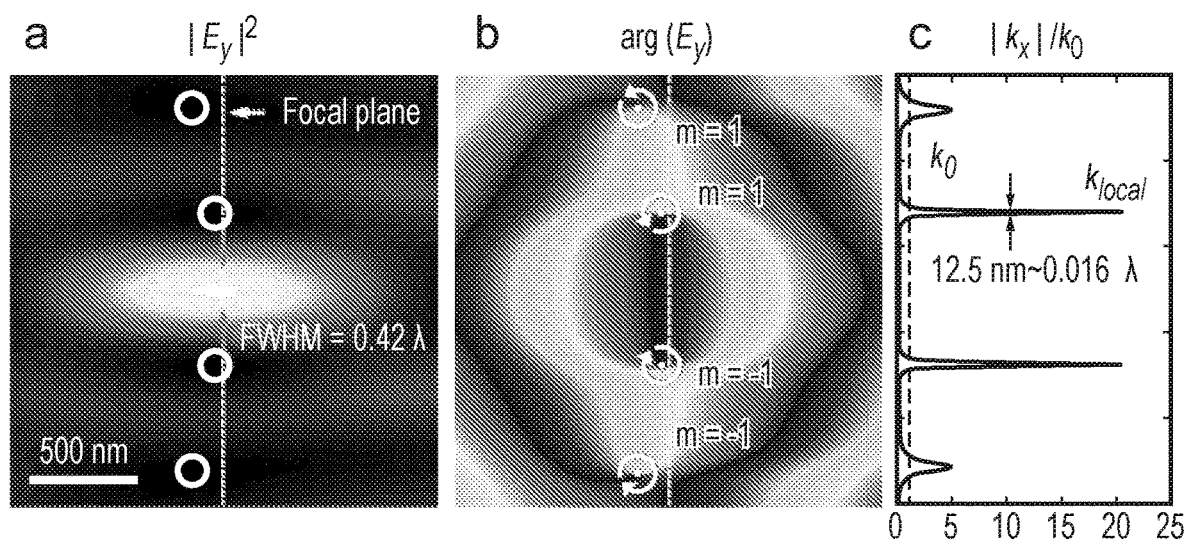
FIG. 6a shows a magnified portion of a computer-generated intensity distribution from FIG. 4 presented as a cross-section of the field perpendicular to the metasurface.
FIG. 6b shows a corresponding phase distribution.
FIG. 6c shows a plot of the local wave vector across the phase distribution of FIG. 6b.

FIG. 6a shows an enlargement of part of FIG. 4, being the part marked by a box in the top left intensity map, with the "focal plane" (plane occupied by the hotspot) at 10 µm distance from the metasurface marked as a dotted line. From this it can be appreciated that the superoscillatory hotspot or focus has a size along the x-direction which is smaller than that predicted by the Abbe-Rayleigh diffraction limit, because this limit does not take account of superoscillation.

The focus is surrounded by fringes, similar to how the focal spot of a conventional lens of finite size is surrounded by the oscillating Airy pattern. However, here the fringes are more densely spaced than in an Airy pattern, and more extensive fringes are present. Indeed, it is known that superoscillatory hotspots are always surrounded by intense halos or fringes. At the focal plane, the intensity of the first side lobe is 17.6% of the peak intensity of the central hotspot. For the experimental results shown in FIG. 5, the corresponding figure is 16%. Hence, a superoscillatory field contains many small scale rapidly changing spatial intensity features that may be utilised for imaging or metrology.

The phase of the superoscillatory field is also of significant interest for some purposes, and can be extracted or retrieved from the intensity of the interferometric pattern. If intensity distributions or maps, designated as I, are measured that are generated from illumination of the metasurface with each of LCP, RCP and ±45° linear polarised light, it is possible to retrieve the phase $\varphi$ of the superoscillatory field. The phase distribution $\varphi$ of the y-polarised component $E_y$ of the field is $\varphi=\arg(E_y)$, and this can be retrieved from the intensity distribution of this component, $I_y$, of the interference pattern at a distance z from the mask using the following equation:

$$\varphi = a\tan\left(\frac{I_y^{LCP} - I_y^{RCP}}{I_y^{+45°} - I_y^{-45°}}\right) + k_0 z \qquad (1)$$

in which $I_y$ is the y-polarised component of the intensity distribution for each polarisation state as indicated by the superscripts, and $k_0$ is the free space wavevector for the wavelength λ of the illuminating light. In the present example, the relevant distributions of intensity and phase are in the x-z plane, so comprise $I_y(x,z)$ and $\varphi(x,z)$, but in other cases may be in the x-y plane so comprise and $I_y(x,y)$ and $\varphi(x,y)$, or may be linear distributions only, such as along the x-direction so as to comprise $I_y(x)$ and $\varphi(x)$.

FIG. 6b shows a phase map in the x-z plane retrieved from the intensity map in FIG. 6a. From this, it can be appreciated that superoscillatory fields contain phase singularities; these are indicated in FIG. 6a and FIG. 6b by the circular arrows. At the low intensity regions near the hotspot, on either side of the fringes, four phase singularities can be observed. When moving around a loop encircling a phase singularity (such as the circular arrows), the phase changes by $2\pi$. The two singularities in the upper part of the phase map have a topological charge of m=+1, while in those in the lower part have a topological charge of m=−1. They are present on a minute scale.

The presence of these phase singularities produces a third important feature of superoscillatory fields. The local transverse wavevector, $k_x$ (if we consider the x direction), at positions along the x direction corresponding to the singularities, has large or gigantic values far exceeding the free space wavevector $k_0=\omega/c$. The local wavevector is determined from the phase, according to $k_x=\text{curl}_x\varphi$. Since the underlying phase singularities occupy a minute space, the corresponding local wavevector peaks are also very small in width, and well below the diffraction limit.

FIG. 6c shows a plot of the normalised transverse local wavevector, $|k_x|/k_0$, at z=10 µm. From this it can be seen that $|k_x|$ has a pattern of large and very narrow peaks corresponding to the positions of the phase singularities, and at or near the phase singularities has values more than an order of magnitude higher than $k_0$ (the value of which is indicated by FIG. 6c by the dotted line). As indicated on the plot, the FWHM of the larger peaks, corresponding to the singularities closest to the hotspot, is 12.5 nm, which is approximately 0.016λ for the 800 nm wavelength. In other words, the superoscillatory field offers spatial features in free space on the scale of about λ/100, or one hundredth of a wavelength. This is highly significant as a means for improving the resolution of imaging and metrology very greatly compared to the restrictions imposed by the Abbe-Rayleigh diffraction limit.

Experimental results have been obtained that correspond well with the simulation of FIGS. 6a, b and c. In particular, very large values of the local k vector have been determined experimentally, in line with FIG. 6c.

The presence of such small-scale, sub-diffraction limit, features in both the intensity and phase domain (the superoscillatory hotspot and the phase singularities) offers greatly enhanced resolution for imaging and metrology techniques.

More details regarding the generation of superoscillatory fields and the spatial details which they contain and which may be extracted from them can be found in [8].

Since the FIG. 1 intensity metasurface discussed thus far has translational symmetry in the y-direction, the intensity distribution of the superoscillatory field in the x-y plane, that is, in a plane parallel to the metasurface, is substantially non-variant in the y-direction (the metasurface acts similarly to a cylindrical lens with its curvature in the x-direction). In other words, the field comprises a series of stripes of varying intensity. At the focal plane the field comprises a central bright line corresponding to the hotspot, and less intense side bands corresponding to the fringes adjacent the hotspot. It is hence also meaningful to consider the intensity, phase and k vector distributions in one dimension only, along a line parallel to the x axis and lying in the focal plane.

Figure 7:
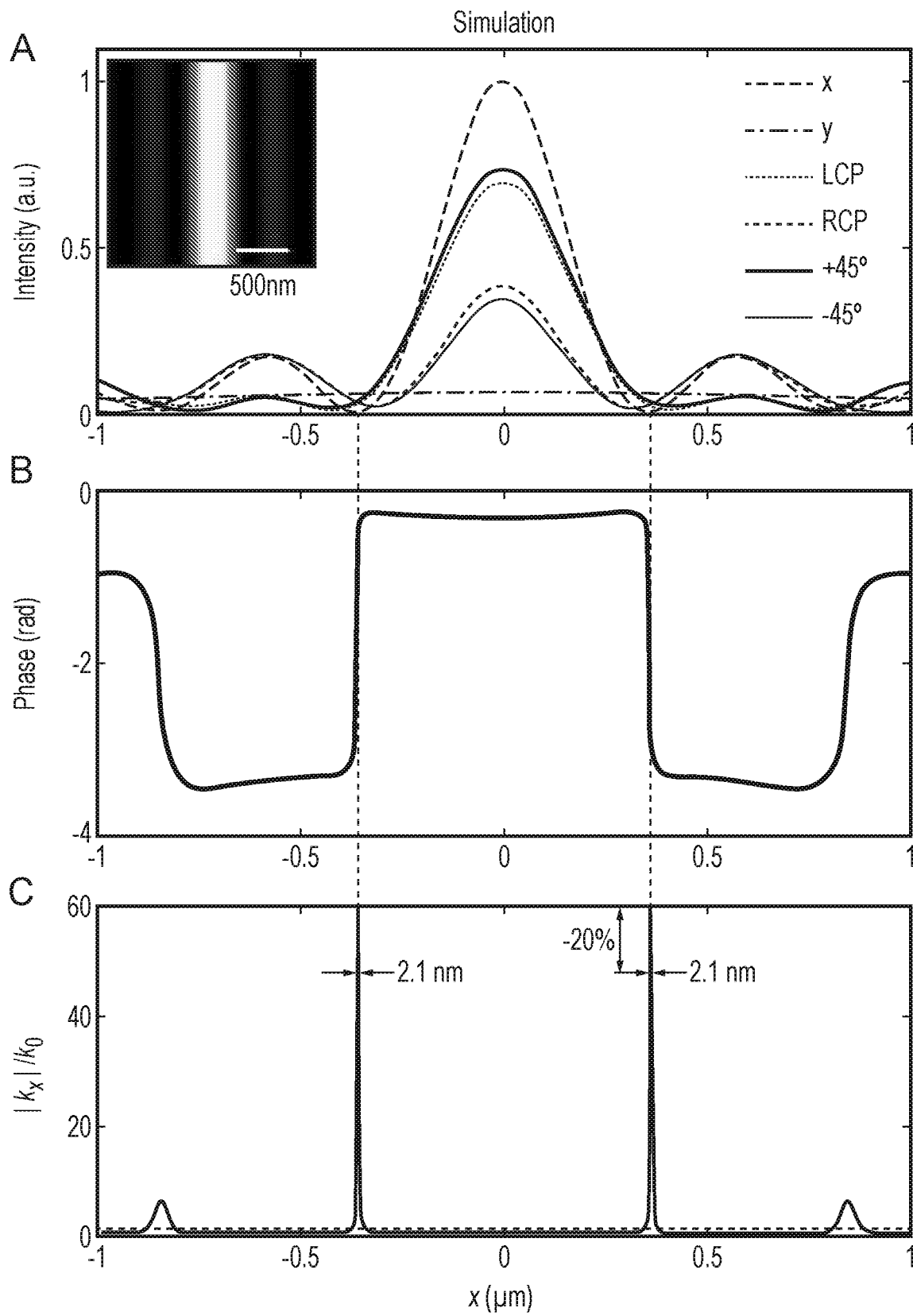
FIG. 7A shows a plot of one-dimensional intensity distributions for a computer-generated superoscillatory field generated from different incident plane wave polarisations presented as a cross-section of the field parallel to the metasurface.
FIG. 7B shows a plot of the corresponding phase.
FIG. 7C shows a plot of the corresponding local wave vector.
FIGS. 7D, E and F show experimental data produced using the same parameters as the computer generation of FIGS. 7A, B and C.
Figure 7:
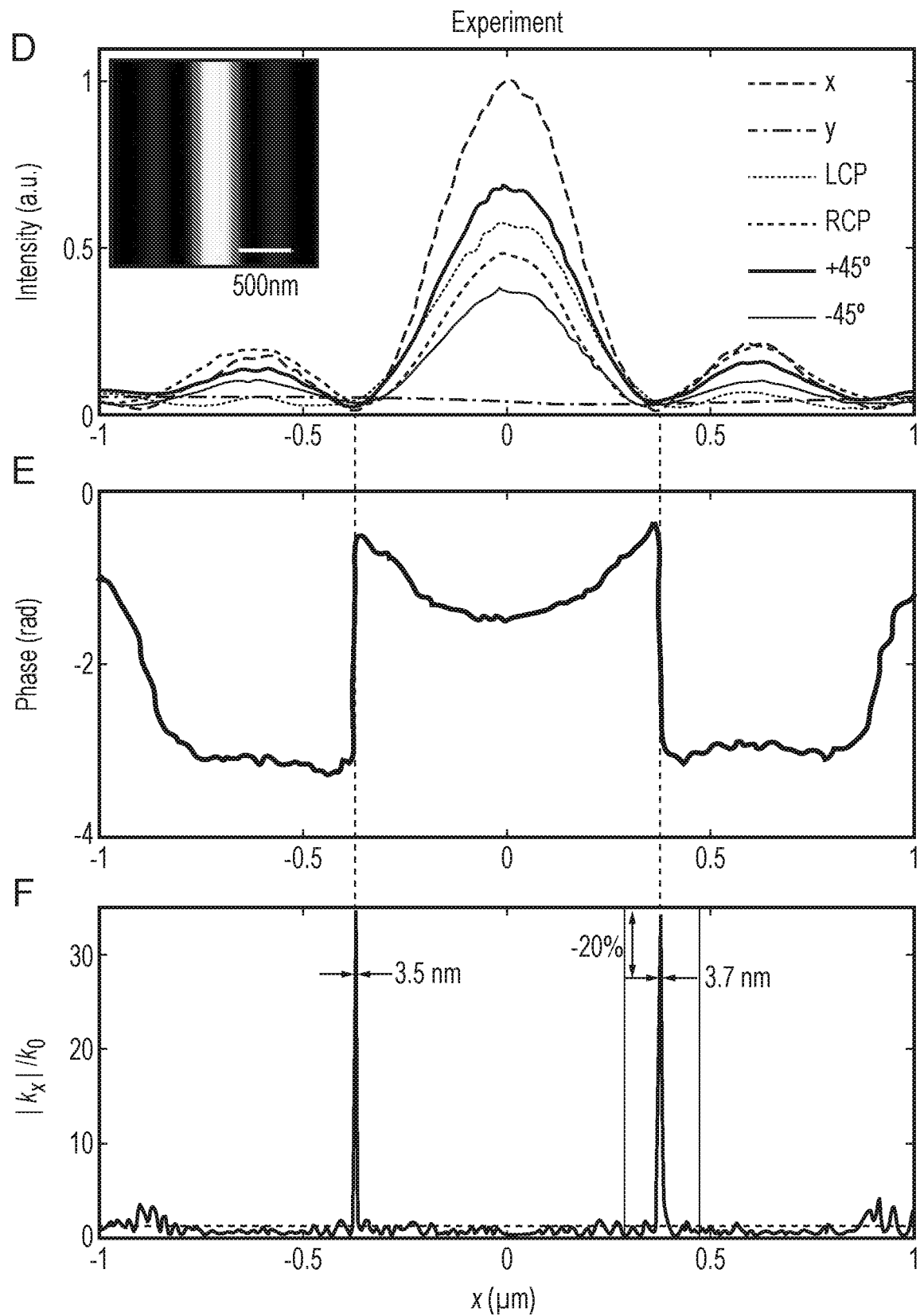

FIG. 7 shows simulated and experimental results of such an analysis, using the same metasurface as previously discussed, and a wavelength of 800 nm. Experimentally, an improved detection arrangement was used; the intensity was detected using a ×1300 magnification optical system with NA=0.95 to project the diffraction field onto a CMOS sensor with a pixel size of 6.5 μm, which gave an effective pixel resolution of 5 nm in the observation plane. FIG. 7A shows the intensity distribution of the y-component along the x-direction in the focal plane for the various incident polarisations: linear x and linear y, LCP and RCP and linear ±45°. The y-polarisation result corresponds to the substantially constant reference field, so shows no peaks, while the other five results show a central peak at the hotspot location and side peaks corresponding to the fringes discussed with regard to FIG. 6a. Inset in FIG. 7A is an image of the intensity distribution in the x-y focal plane, showing the stripes mentioned above.

FIG. 7B shows the phase distribution along the x-direction, retrieved from the intensity distributions at the different polarisations of FIG. 7A, calculated in accordance with equation (1). There are very rapid phase changes corresponding to the regions of lowest intensity, which arise from phase singularities such as those shown in FIG. 6b.

FIG. 7C shows the distribution of the normalised local wave vector along the x-direction, determined from the phase distribution of FIG. 7B. As expected, it shows large and narrow peaks arising from the rapid phase changes. The larger peaks have a width of 2.1 nm at 80% height.

In line with the data of FIGS. 6a and 6b, it is again apparent that within a superoscillatory field, there are areas of rapid variations of phase and corresponding peaks in the local wavevector which are much narrower than the hotspot itself, which is nonetheless also narrow enough to be of interest for super-resolution applications.

FIGS. 7D, E and F show experimental results corresponding to the computer simulations shown in FIGS. 7A, B and C. The experiment can be seen to match the theory well, with the large local k vector peaks having widths of 3.5 nm and 3.7 nm, corresponding to about 0.004λ. This indicates the possibility of even higher resolution than the 12.5 nm wide local k vector peaks shown in FIG. 6c. Hence, very narrow spatial features with extremely sub-wavelength dimensions are available for metrology and imaging.

Figure 8:
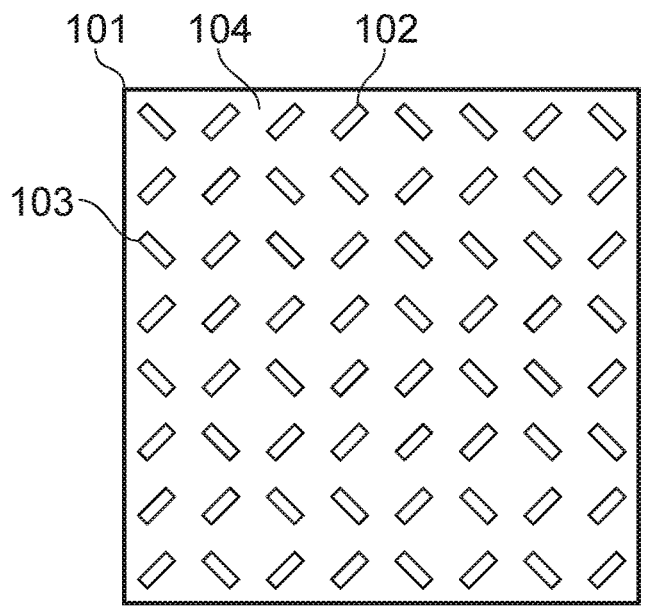
FIG. 8 shows a schematic plan view of a third example metasurface suitable for generating a two-dimensional random superoscillatory field.

FIG. 8 shows a plan view of an example metasurface 101 formed in a planar plasmonic film 104 and patterned with an entirely random distribution of slits, some slits 102 oriented at +45° and some slits 103 oriented at −45°.

Figure 9:
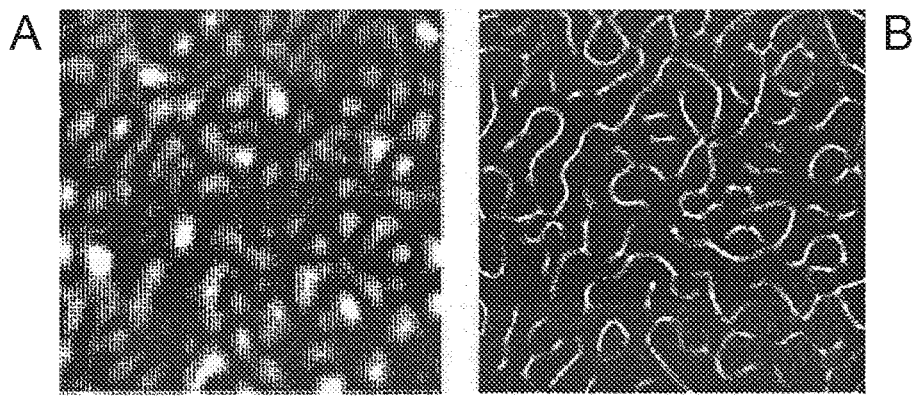
FIG. 9A shows an intensity distribution of a random superoscillatory field generated from a metasurface such as the FIG. 8 example.
FIG. 9B shows the corresponding local wave vector distribution.

FIG. 9A shows an intensity map in the x-y plane (parallel to the mask) generated by a randomly patterned mask such as the FIG. 8 example. The absence of any invariance in the slit pattern in either the x or y directions produces a superoscillatory field which varies randomly in both the x and y directions (two-dimensional superoscillatory field), in contrast to the striped pattern of the one-dimensional superoscillatory field produced by metasurfaces such as the FIGS. 1 and 2 examples. The intensity distribution comprises random speckle patterns including multiple discrete hotspots.

FIG. 9B shows the corresponding distribution of the local wavevector $k_x(x,y)$, calculated from a phase map $\varphi(x,y)$ retrieved from multiple two-dimensional intensity maps $I(x,y)$ at different incident polarisations as already explained. It can be seen that the wavevector features are significantly narrower than the intensity features, in line with the one-dimensional results already discussed. As before, the field contains phase singularities and therefore has features which change over distances that are orders of magnitude smaller than the wavelength of the light used to generate the superoscillatory field.

Both one-dimensional and two-dimensional intensity, phase and local wavevector maps may be utilised for metrology and imaging at super-resolutions.

In summary, therefore, the diffraction of a coherent plane wave by a nanostructured mask (also metasurface, intensity metasurface or mask, phase metasurface or mask, metamaterial mask, nanostructured metasurface) generates a free space (far-field) optical field by the interference of bandlimited waves (one superoscillatory and one substantially plane), which can have significantly sub-wavelength spatial features such as optical phase singularities and sub-diffraction hot-spots. As noted, the superoscillatory field may or may not be interferometric (the interference of a superoscillatory wave and a plane wave), according to the nature of the mask used to generate it. Moreover, and for all cases, the field can be magnified by conventional lens systems without loss of resolution, and projected to conventional optical detectors or cameras for detection of the intensity distribution of the field in real time. According to the present disclosure, it is proposed to use fields of this type for imaging with greatly enhanced resolution, far below the diffraction limit of half a wavelength.

Herein, the concept of imaging is not limited to recording or detecting the appearance of an object, but includes identifying, determining, deducing or measuring one or more externally discernible characteristics, properties or features of an object from a measurement of light diffracted by that object, such as the size and/or shape of part or all of the object, or a change in size or shape, or motion/movement. It may or may not comprise a determination of the appearance of the complete object.

If an object of interest, to be imaged, identified or characterised in some way, is placed in the superoscillatory field, containing phase singularities and/or zones of high light localisation (hot-spots), (for example, in the plane in which the phase singularity is situated), it will scatter some of the light and change the diffraction pattern embedded in the field. The presence of the object will perturb the phase singularities in the field, so that the pattern of the field is altered. This alteration can be detected and used to determine information about the object, at excellent spatial resolution owing to the very small size of the singularities.

Figure 10:
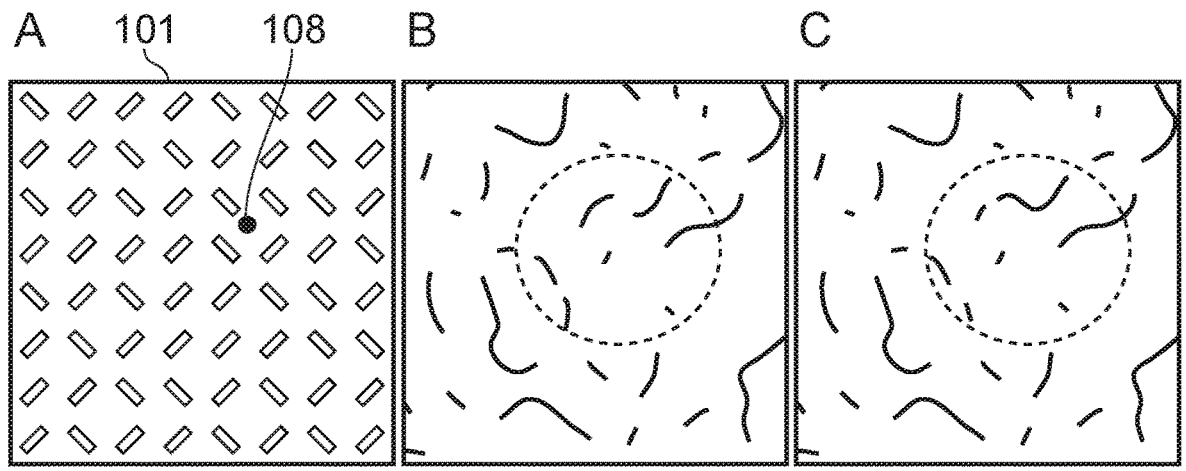
FIG. 10A shows a schematic plan view of a further example metasurface suitable for generating a superoscillatory field.
FIG. 10B shows a local wave vector distribution of the superoscillatory field generated by the metasurface of FIG. 10A.
FIG. 10C shows the local wave vector distribution of the superoscillatory field distorted by an object placed in the object plane of the field.

FIG. 10A shows a plan view of a metasurface 101 configured with an array of randomly oriented slits (as in the FIG. 8 example) for generation of a two-dimensional superoscillatory field in the x-y plane (the field is interferometric owing to the mask type, but this is not essential for the imaging methods disclosed herein). FIG. 10B shows the local wavevector map determined from detecting the intensity map of the superoscillatory field generated by the metasurface 101. A particular area is highlighted by a circle. Note that this wavevector map is obtained with no object to be imaged present in the superoscillatory field.

A nanoscale object, such as a nanoparticle 108, is then placed in the superoscillatory field, where it causes diffraction and scattering. Its position within the x-y plane is indicated in FIG. 10A. FIG. 100 shows the local wavevector map determined from the intensity map of the superoscillatory field with the object present within it. Comparison of the circled area in FIG. 100 with that of FIG. 10B shows how the nanoparticle has distorted the wavevector distribution (resulting from distortion of the intensity distribution and corresponding changes to the phase distribution, particularly the location of the phase singularities). This change can be used in techniques for imaging a nanoscale object or otherwise determining information about such an object.

Figure 11:
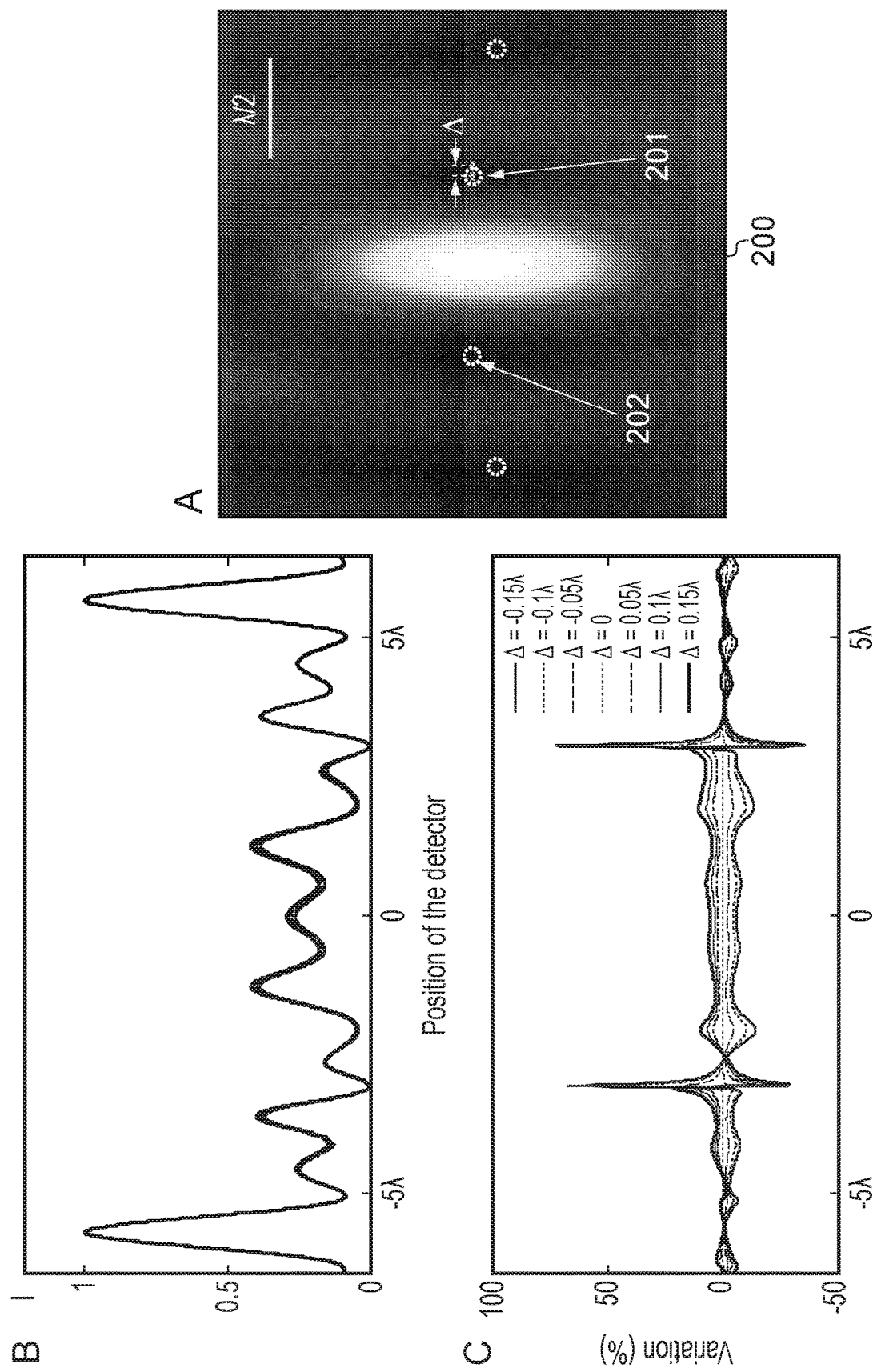
FIG. 11A shows a computer-generated image of a superoscillatory field, modelled to show the scattering effect caused by positioning a nanoparticle in the field.
FIG. 11B shows a modelled intensity distribution across the superoscillatory field at a distance from a nanoparticle placed in the field at a phase singularity.
FIG. 11C shows variations in the intensity distribution for different displacements of the nanoparticle from the phase singularity.

FIGS. 11A, B and C illustrate in more detail the effect of placing a nanoparticle in a superoscillatory field. FIG. 11A shows a computer generated image of a superoscillatory field 200, with an object in the form of nanoparticle 201 with a size of 40 nm placed in a phase singularity 202. The nanoparticle causes scattering of the field 200. Computer modelling was used to determine how the intensity pattern or distribution of the scattered light changes as the nanoparticle is displaced by a distance $\Delta$ from the singularity. This mimics a real imaging process as described in more detail below, in which, for convenience, the superoscillatory field is scanned across an object of interest to be imaged, and intensity distributions are detected as a distance from the object. For the modelling, the scattered light was "detected" as a distance of $10\lambda$ in the forward propagation direction from the plane containing the object and the phase singularity, to produce an intensity distribution parallel to the object plane.

FIG. 11B shows a plot of the intensity distribution, shown as intensity I (vertical axis) against the position of the detector across the field (which thereby builds up a distribution from point intensity measurements).

FIG. 110 shows plots of the percentage variation of the detected intensity I (as compared to the FIG. 11B values) against detector position, for different values of the distance $\Delta$, being a displacement of the nanoparticle from the phase singularity. From this it can be appreciated that there is a very strong variation of intensity with object displacement, which can be used to identify fine details or characteristics of the object, since different positions produce different intensity distributions, and also different particle types and sizes will product different intensity distributions.

The intensity of superoscillatory regions in the superoscillatory field can be relatively low, which may seem to be disadvantageous for imaging applications. In reality, this can be a benefit, because even the very weak scattering of a small nanoparticle can have a discernible effect and act to distort the position of the phase singularities in a detectable way.

Figure 12:
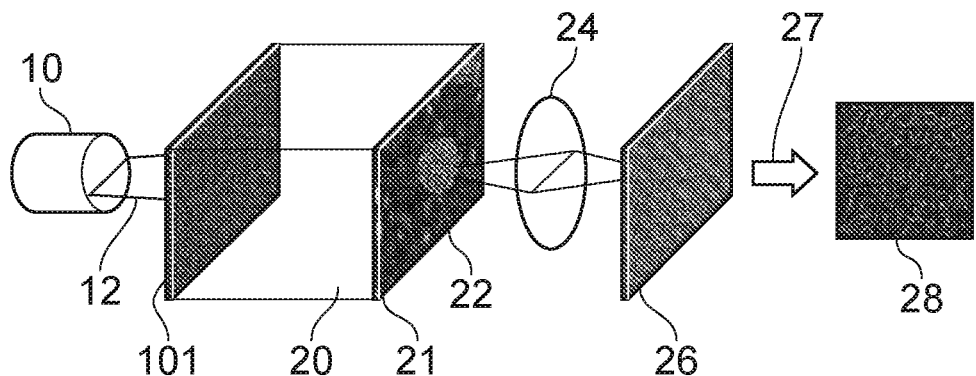
FIG. 12 shows a schematic representation of example apparatus suitable for generating a superoscillatory field for use in imaging an object according to examples disclosed herein.

FIG. 12 shows a schematic perspective view of a simple apparatus for generating a superoscillatory field and measuring its intensity pattern, suitable for use in obtaining intensity information required for the imaging methods described herein. A laser 10 is operable to generate a coherent planar output light wave 12, which has a polarisation selected using a polarising apparatus (not shown) provided for the laser 10. The light wave is incident onto a metasurface 101 such as the examples previously described. The metasurface 101 in this example is an interferometric mask, so transmits a superoscillatory wave and a reference wave which interferometric ally interact, also as already described. This generates an interferometric superoscillatory optical field 20 extending on the transmission side of the mask in the z direction and containing the hotspot and the phase singularities already described. These are located in slightly different planes in the far field from the metasurface 101, parallel thereto and at different distances from the metasurface (different values of z), as can be seen in FIGS. 6a and 6b. Either plane may be used as an object plane or imaging plane for imaging methods, where the resolution achievable from the imaging depends on the precision of positioning within either of the planes, and the choice of plane. The phase singularity plane can offer higher resolution owing to the smaller size of the phase singularities compared to the hot spot, although both are orders of magnitude sub-wavelength. As an example the focal plane containing the hot-spot may be generated at a distance of $12.5\lambda$ from the metasurface 101; this is the distance for a Pancharatnam-Berry phase metasurface as described previously. The distances to these planes can be engineered by design of the metasurface. An object 22 of interest is placed in the superoscillatory field 20 at the selected object plane 21, being the focal plane containing the hot-spot or a plane containing phase singularities. The object distorts the superoscillatory field in its vicinity. Light diffracted by from the object is projected onto an optical detector 26, in order to record the intensity distribution of at least that part of the superoscillatory field. In this example, to magnify the pattern of the scattered field, a magnifying apparatus 24 (one or more lenses or mirrors) is placed between the object/imaging plane 21 and the optical detector. The magnification helps to mitigate spatial resolution (pixelation) of the optical detector 26, since the physical size of pixels in the detector will typically be larger than the resolution achievable from superoscillatory imaging. Magnification is not essential, however. The detector 26 may be able to detect light over a two-dimensional area, such as a CCD array or a CMOS camera with a two-dimensional array of pixels. Alternatively, the detector may be a one-dimensional detector having a line of pixels, or a point detector comprising effectively one pixel. Multiple intensity measurements from any of these alternatives may be combined in order to obtain an intensity map of a larger area if required. This may depend on whether the object characteristic of interest lies in one or two dimensions, for example, a distance over one dimension such as a spacing or object width, or orthogonal distances or sizes or feature distributions over two dimensions. The intensity measurement or map (distribution) recorded by the detector 26 can be used directly, or may be subject to a phase retrieval process 27 in order to determine the corresponding phase distribution or local wavevector distribution 28. In the latter cases, it is necessary to measure intensity distributions for multiple input polarisations in order to extract the phase distribution as already described. In the former case, there is no need to generate an interferometric superoscillatory field; the intensity distribution of either an interferometric or a non-interferometric superoscillatory field will suffice.

At a very simple level, the intensity, phase or local wavevector distribution of the superoscillatory field can be measured in order to detect motion of an object on the nanoscale (nano-motion). As described with respect to FIGS. 10A and 10B, the presence of an object distorts the field, so that the presence of an object can be detected by comparison of one or more measured distributions with a corresponding distribution measured from a known empty field. This may be extended to detect motion by comparing a later measured distribution recorded from a field containing an object with an earlier distribution recorded of the same object in the same field; any difference can be deduced to be caused by motion of the object. Other changes in the object's characteristics may also be discernible in this way, such as a change in the object's size and/or shape. The two distributions can be compared simply by computer, for example.

On a more detailed level, a known imaging technique applicable to nanoscale objects is coherent diffraction imaging, in which an image of an object is constructed from the far-field diffraction pattern of a highly coherent beam of, typically, ultraviolet or x-ray radiation scattered by the object [9]. Coherent diffraction imaging performs reconstruction using intensity information of the diffraction pattern only. The diffraction pattern, which can be detected without a lens, is measured as an intensity map or profile, and iterative feedback algorithms are used to solve the inverse problem of determining the appearance of the object that created the detected diffraction pattern, thereby creating an image. This is a difficult, mathematically ill-defined problem owing to the absence of phase information in the intensity map, and also the resolution is limited by the wavelength of the light (hence the use of short wavelength radiation). A further important point for the present discussion is that coherent diffraction imaging aims to provide a deterministic reconstruction of the object.

In contrast, aspects of the present invention are based on the recognition that deduction can be used to determine information about the object, rather than reconstruction. In other words, a guess is made about the object. The guess is made based on the nature of the alteration of the superoscillatory field caused by the object. The alteration arises from scattering of light by the object, and the nature of the scattering depends on the shape, size, orientation and position of the object. Artificial intelligence (trained neural networks) can be used to carry out the deduction.

In order to carry out the deduction, it is firstly necessary to establish a suitable neural network, which will be embodied as software in a computing system. In accordance with known practice, a neural network has to be trained using a set of training data. In the present case, a suitable set can be obtained by recording intensity maps generated from many different known objects, optionally in different positions within the superoscillatory field. Each measurement is made using the same metasurface and wavelength (and optionally the same polarisation, as discussed further below) so that the same field is generated each time, and this is also replicated when unknown objects are imaged later for comparison and deduction by the neural network.

It is sufficient to utilise only intensity information when deducing object information or characteristics using a neural network. This can simplify the process greatly, in that it is not necessary to retrieve any phase information from the detected intensity distributions, either when collecting the training data set or when imaging an object of interest. Accordingly, the amount of processing is significantly reduced. Also, the amount of intensity measurements that need to be made is also greatly reduced, since there is no need to obtain measurements at multiple different input polarisations for each object in each position in the field. Rather, each image for the test data can be taken using the same polarisation, which is then also used for imaging objects of interest. Alternatively, different polarisations could be used to record more than one image per test object and position in order to increase the size of the training set. Corresponding images at the same polarisation setting can then be taken of an object of interest. Furthermore, a selection of images of an object of interest at different polarisations can be collected and provided to the neural network. The use of different polarisations to increase the number of intensity distributions for either or both of training and imaging could be used to improve accuracy of the neural network performance.

However, it is also feasible to use either phase distribution maps or local wavevector distribution maps for both the training set data and the imaging data for an object of interest, in which case it is necessary to record the intensity data at each relevant input polarisation for every training set object and every object of interest, and extract the phase and optionally calculate the local wavevector for each object. The additional computational overhead involved in this might be outweighed by the higher resolution obtainable from the reduced size of the phase features and wavevector features compared with the intensity features, for instance.

In all cases, once the set of training data is obtained, it is supplied to the neural network together with knowledge of the objects that generated the images, and the network trains in the usual way. Subsequently, an object of interest is imaged (beneficially only in intensity space, but optionally in phase or wavevector space as discussed), and the measured image is provided to the neural network. The network is then able to make a deduction to recognise or identify one or more characteristics of the object of interest, by using deconvolution techniques to map between the image and the information it has learned from the training set, in the known manner for neural network operation. A larger training set will improve the accuracy of the deduction, as is well known. With sufficient training, the neural network can make accurate deductions even about objects which do not match any of the objects imaged in the training set, in other words, objects it has never "seen" before.

Figure 13:
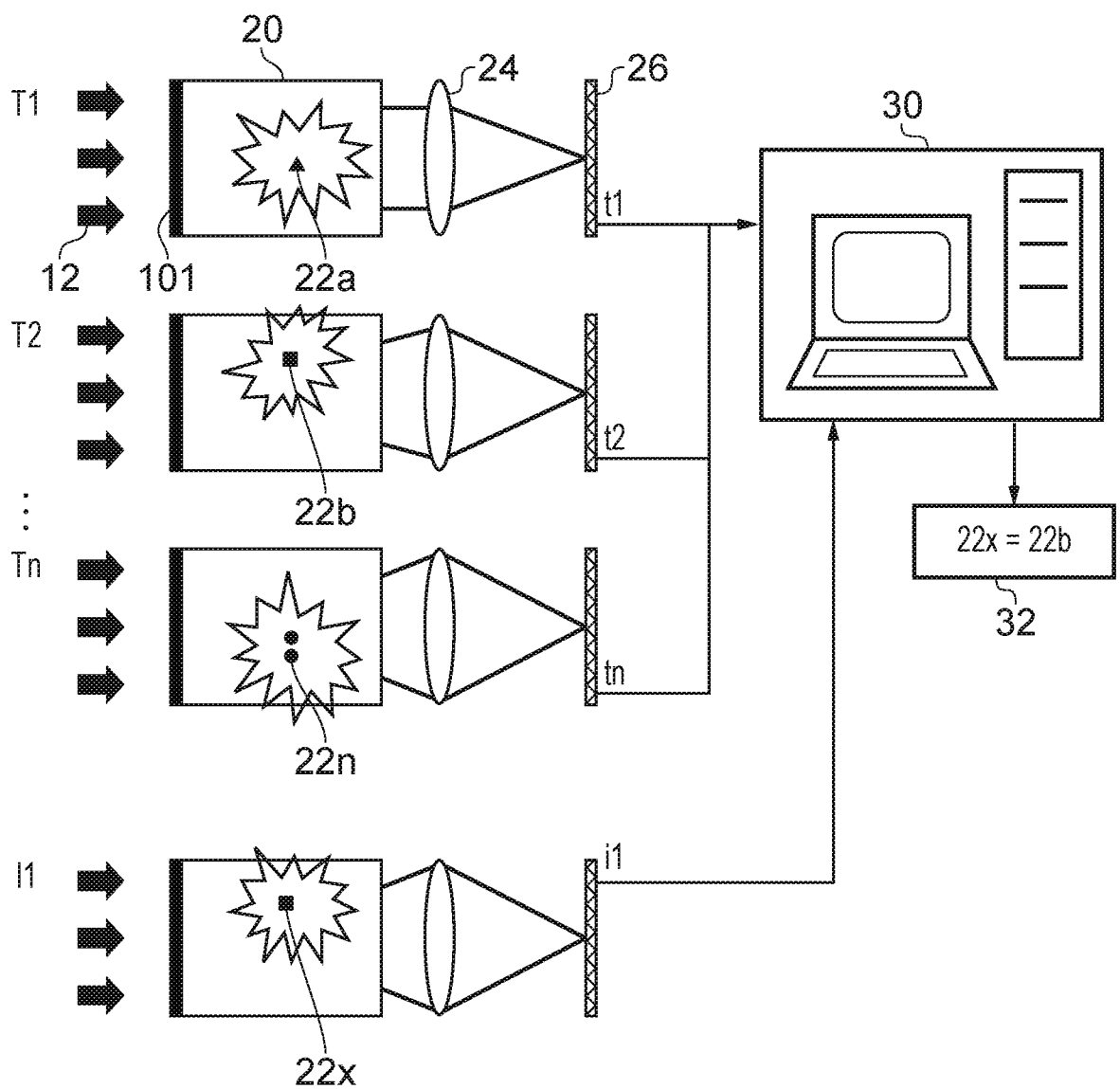
FIG. 13 shows a schematic representation of apparatus suitable for and steps in a method for imaging an object using a superoscillatory field and artificial intelligence according to examples disclosed herein.

FIG. 13 shows a schematic representation of apparatus configured for a procedure for implementing imaging according to an embodiment. In a first training stage T1, a known object 22a is placed at a selected object plane in a superoscillatory field 20 created by diffraction of coherent light 12 of a known selected polarisation incident on a metasurface 101, as before. The intensity profile, distribution or map of the field 20 as scattered by the object 22a is detected at a point, along a line or in a plane by a detector 26, and the resulting intensity measurement t1 is passed to a computer system 30 that hosts the neural network. This is repeated in additional training stages T2 to Tn, for a plurality of different known objects 22b-22n, to generate multiple intensity measurements t2-tn, and for different positions and orientations of the object within the field, which are all passed to the computer system 30. Once collection of an adequate amount of training data (comprising a plurality of intensity measurements of known objects) is complete, the training data is input to the neural network for a learning stage, according to conventional operation of a neural network. The neural network may be a convolutional neural network, for example comprising three convolutional layers, each of which may be followed by a pooling layer. Training might be carried out using the Adam stochastic optimisation method, which minimises the mean absolute error between an observed pattern and a pattern predicted or known for a known object. Other implementations of neural network and artificial intelligence systems may be used instead; the invention is not limited in this regard.

As an alternative to the recording and collection of intensity profiles from a plurality of real objects, training data can be obtained by computer modelling of the perturbation of superoscillatory field intensity distributions caused by the presence of one or more computer-generated objects in the modelled field. Furthermore, measured intensity data and computer generated intensity data could be used together to provide a training data set.

The training data, in the form of intensity measurements, may optionally be converted into phase measurements and/or wavevector measurements as discussed if intensity has been mapped at multiple input polarisations. If this is desired, the optical source used to generate the incident light 12 can be equipped with a polarisation switching assembly operable to rapidly switch the polarisation state of the incident light 12. This can be synchronised with the detector 26 (by both devices being under common computerised control, for example) in order to automate the recording of intensity information for each polarisation state. Note that this is not essential, however, and an important feature of imaging described herein is that the use of neural networks removes the requirement for phase data which is inherent in existing super-resolution imaging techniques that rely on interferometry.

Once the neural network has been trained to a level deemed acceptable (typically, tens of thousands of training data may be required for this, such as 30,000 or 100,000, and additional training data can be provided in an ongoing basis to continually update and improve the neural network if desired), the system can be used for the imaging, characterisation or identification of objects of interest. In an imaging stage I1, an unknown object 22x is placed in the superoscillatory field and at least one intensity measurement i1 of the field as scattered by the object is made and passed to the computer system 30. After undergoing any phase retrieval and wavevector calculation necessary to correspond to that applied to the training data t1-tn (recall that this is entirely optional, and the describing imaging method works very accurately with high resolution using intensity information only), the measurement(s) i1 is fed to the neural network, which performs its deduction in the known manner. The computer system then provides an output 32, representing its best guess about the nature of the unknown object 22x. In the present example, the unknown object 22x can be seen to have the same shape and size as the known object 22b from training stage T2, so the output 32 identifies the unknown object 22x as being the same as known object 22b, based on determining a high level of correspondence between the training data t2 and the image intensity measurement i1. In reality, an unknown object may have no direct match with any object from the training process, but a properly trained neural network is able to accurately deduce characteristics of previously unseen objects, based on its knowledge gleaned from the training data.

Although one single intensity measurement from the unknown object can be provided to the neural network, an improved outcome (in terms of accuracy and speed) can be obtained by acquiring a plurality of (two or more) intensity measurements as input to the neural network. Accordingly, the method can usefully comprise the recording of multiple intensity distributions for a single unknown object. The multiplicity may be obtained by recording an intensity distribution of scattered light for each of multiple positions of the object within the relevant plane of the superoscillatory field (that is, different x and y positions for constant z). This can be achieved by moving the object within the plane, or by scanning the field across the object which is kept stationary. For example, the mask can be translated within the xy plane at z=0 to change the location of the hotspot within the focal plane if that is the chosen imaging/object plane.

Figure 14:
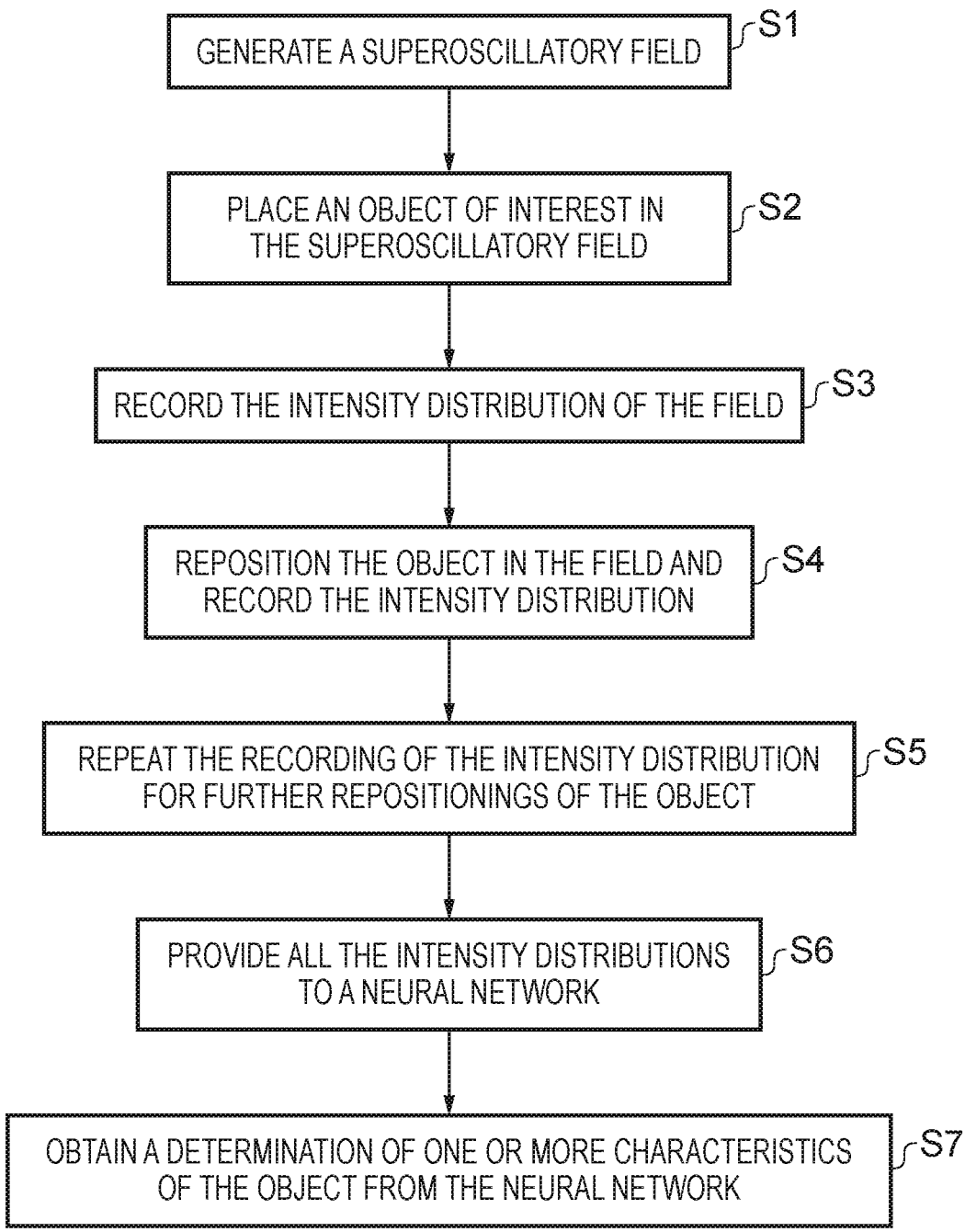
FIG. 14 shows a flow chart of steps in a method for imaging an object using the intensity of a superoscillatory field and artificial intelligence according to examples disclosed herein.

FIG. 14 shows a flow chart of steps in a method to achieve super-resolution optical imaging using a superoscillatory field and a neural network. In a first step S1, a superoscillatory field is generated, for example as previously described by use of a metasurface. The field matches a field (actual or computer-modelled) previously used to generate training data for a neural network. In a next step S2, an object of interest with one or more unknown characteristics which are to be measured, identified or otherwise determined is placed in a first position in the object plane of the superoscillatory field which contains the hot-spot or phase singularities. In a next step S3, the intensity distribution of the superoscillatory field scattered by containing the object is detected and recorded. In a next step, S4, the object is moved to a different position (repositioned) in the object plane (by relative movement of the object and the metasurface in which one or both are translated) and the new intensity distribution of the scattered superoscillatory field is recorded. In step S5, step S4 is repeated to acquire a desired total quantity of intensity distributions, for example 5 or 10 or 20 or 50 (other amounts may be used as preferred). In step S6, the intensity distributions from steps S3, S4 and S5 are input into the neural network that has been previously trained using intensity patterns corresponding to known objects in the same superoscillatory field. In step S7, the neural network analyses the input intensity data in the known manner of neural network operation, and delivers a result comprising its best guess or determination (deduction) regarding the one or more characteristics of the object of interest.

In a numerical modelling procedure designed to prove the concept of neural network-based super-resolution imaging based on superoscillatory fields, the object of interest was selected to comprise a pair of parallel bars with an unknown width and separation (spacing or gap), with the aim of detecting the size of the separation, width of the bars and their position in the imaging plane. While apparently elementary, such a task is nevertheless important and relevant; the need to accurately determine small distances and sizes is widely applicable, such as in the nanoengineering sector. After training a neural network with multiple computer generated images of pairs of bars with known separations, the neural network was then used to identify the width, position and separation size of many additional pairs of bars from further computer models. All images for training and measurement comprised intensity distributions of the diffracted field only, with no conversion to phase or wavevector.

Figure 15:
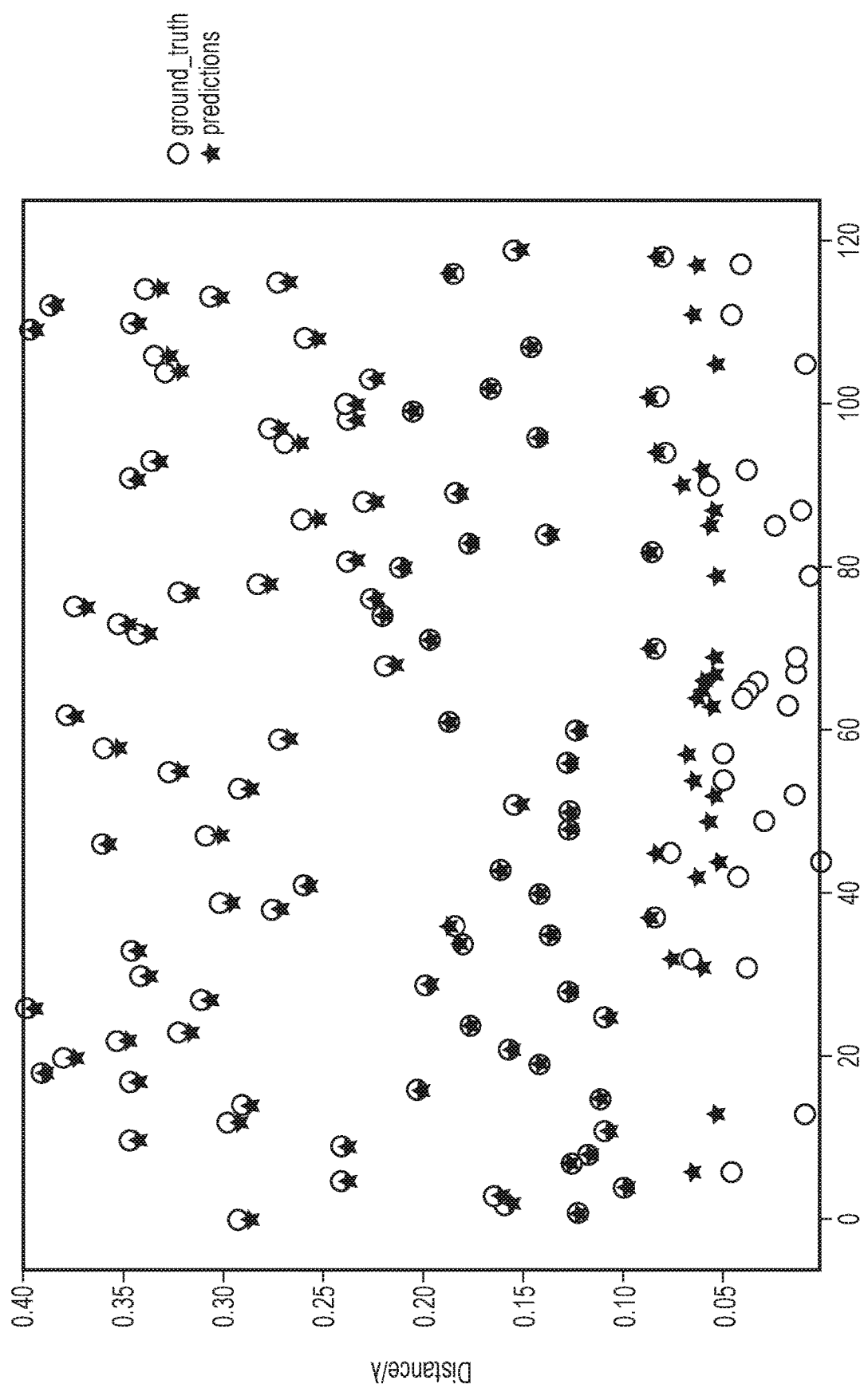
FIG. 15 shows a plot of computer-generated experimental results obtained using an example method for imaging an object using a superoscillatory field and artificial intelligence.

FIG. 15 shows a plot of the results of multiple image identifications made by the trained neural network. A total of 120 modelled samples was imaged (horizontal axis), and each is plotted on the graph to show its actual gap size and also the gap size identified or guessed by the neural network (vertical axis). The circular dots indicate actual gap size and the stars indicate the guess made by the neural network, in units normalised to the wavelength of the imaging light. It can be seen that gaps are very accurately guessed at sizes over about $0.05\lambda$ ($\lambda/20$). Larger gaps are imaged or identified at resolutions better than $\lambda/100$ (determined by the vertical axis difference between the dots and the stars). It is expected that resolution in the range of $\lambda/100$ to $\lambda/1000$ could be achievable. For shorter wavelengths, this gives access to atomic-scale resolution, atoms having diameters in the range of about 0.1 nm to 0.5 nm.

A similar task is the imaging of dimers, being two randomly positioned particles of unknown but sub-wavelength size and separation, which is of interest for bio-imaging and other nanotechnology applications. Further computer modelling has been carried out to demonstrate the efficacy of super-resolution imaging for this procedure. The object of interest in this experiment was an opaque dimer comprising two elements with different sizes A and C separated by an edge-to-edge distance B. Superoscillatory field scattering from multiple such known objects was modelled and recorded to obtain training data, which was then provided to a neural network for training. The objects were located in the vicinity of a phase singularity in the superoscillatory field. Only the intensity of the scattered field was used in this instance. Then, computer-generated intensity distributions from "unknown" dimers were modelled and fed to the trained neural network for imaging, which in this case comprised identification (estimation) of the characteristics of dimer size, dimer separation and dimer position in the superoscillatory field.

Figure 16A:
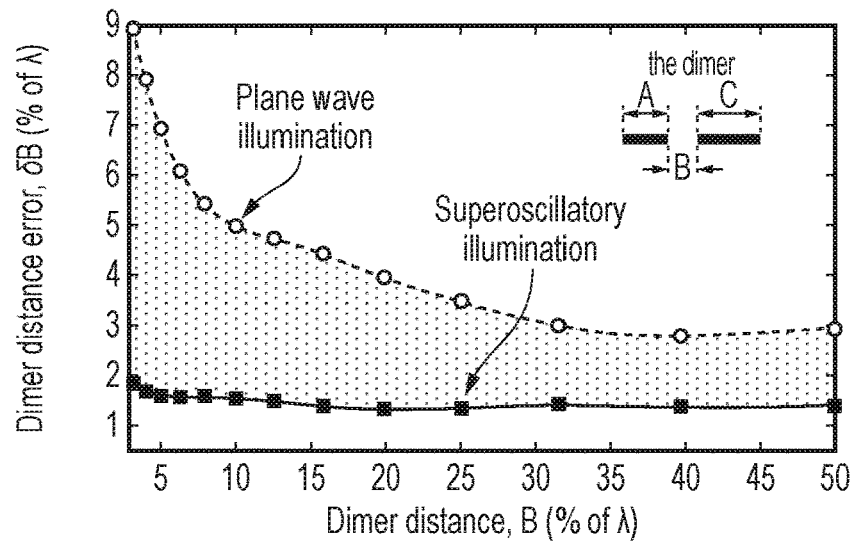
FIGS. 16A, B and C show graphs indicating errors in determining, respectively, dimer separation, dimer size and dimer position using superoscillatory imaging and artificial intelligence, the results produced by computer modelling, and including corresponding errors for plane wave imaging for comparison.

FIG. 16A shows a graph of some results of this procedure. The dimer configuration is inset in the top right of the graph. The actual separation B (dimer distance) of the unknown dimers is plotted on the horizontal axis, as a percentage of the free-space wavelength of the light used to model the superoscillatory field. The vertical axis shows the error in the dimer distance determined or estimated by the neural network compared with the actual dimer distance, again as a percentage of the wavelength. The square data points show the results of the superoscillatory imaging. It can be seen that the error remains below 2% of the illuminating wavelength for even very small dimer separations, below 5% of the wavelength.

For the purposes of comparison, corresponding imaging under plane wave illumination was also modelled. The circular data points show these results, from which it can be seen that the error in determining the dimer separation is much larger for plane wave imaging.

Figure 16B:
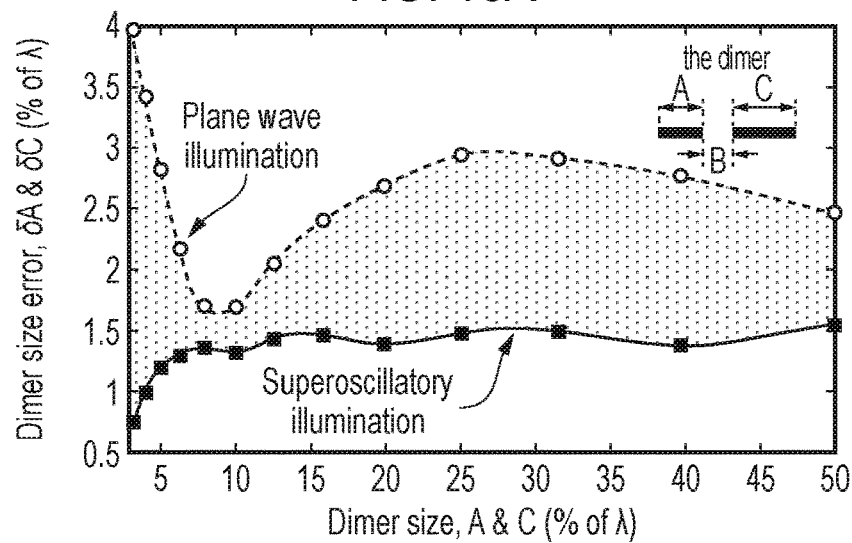

FIG. 16B shows a graph of results of imaging the characteristic of dimer size, A and C, again shown as the error in the estimated size A and C for different values of dimer size (squares). The error is less than 1.5% of the wavelength for all dimer sizes, and falls below 1% for dimer elements as small as 3% of the wavelength. Again, corresponding results for plane wave illumination are shown (circles), with errors as much as five times greater for the smallest dimer sizes.

Figure 16C:
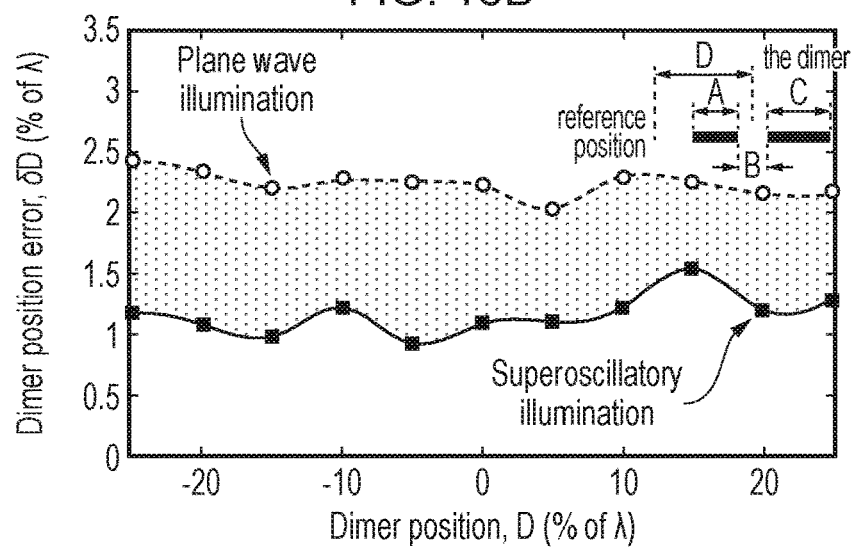

FIG. 16C shows a graph of results of imaging the characteristic of dimer position, represented as a distance D of the dimer from a reference point. This configuration is shown in an inset in the top right of the graph. As before, the graph shows the error in the dimer position estimated from superoscillatory imaging as a percentage of wavelength, for a range of dimer positions (squares). The error is near or below 1.5% for all studied positions. In contrast, plane wave imaging determines the dimer position with a larger error, with the superoscillatory imaging being about twice as accurate (the error is halved).

In more detail regarding the use of artificial intelligence to make the estimations of dimer characteristics shown in FIGS. 16A, B and C, multiple intensity distributions (scattering or diffraction patterns) were measured (modelled) by a detector array for some different illumination conditions of the unknown dimers, and analysed by a convolutional neural network. The network comprised an input layer, three convolution layers and an output layer. The three convolution layers had 32-3×11, 64-3×11 and 32-3×11 kernels respectively. Each convolution layer was followed by a pooling layer with 1×5 kernels that implemented a rectified linear unit sigmoidal activation function. The network was trained with the Adam stochastic optimisation method to minimise the mean absolute error between the diffraction pattern for the unknown dimer observed by the detector, and the diffraction pattern that a predicted dimer should have produced. The neural network was trained using a training data set containing 30,000 samples (diffraction patterns (intensity distributions) produced by known dimer). The training data was generated by creating (by computer modelling) dimers of random sizes placed in the object plane of the superoscillatory field with the centre of the dimer randomly chosen to be positioned in an interval of $-\lambda/2$ to $\lambda/2$ from the reference point.

These results demonstrate that imaging with superoscillatory illumination allows an object to be "seen" (its characteristics to be determined) with much better resolution than plane wave illumination.

In particular, the achieved resolution is far beyond the diffraction limit of half the free space wavelength of the illuminating light, $\lambda/2$. FIG. 16A illustrates that when imaging to measure the dimer separation, the resolution is better than $\lambda/50$. For an example of illumination with 500 nm light, this corresponds to 10 nm resolution. FIG. 16B shows that the size of small dimers can be determined with a resolution better than $\lambda/100$. FIG. 16C shows that the position of a dimer with an overall size of about $\lambda/5$ can be measured with an accuracy better than $\lambda/50$.

In an alternative embodiment, it is proposed that intensity measurements made of a superoscillatory field scattered/diffracted by a nanoscale object, and (optionally) retrieved phase information, can be used for partial or complete reconstruction of an object's appearance. It is known to image an object using backward wave propagation according to the Kirchhoff-Helmholtz integral, based on intensity and phase information of coherent light scattered from the object and measured over a closed or open surface or curve surrounding or partly surrounding the object. The present embodiment proposes to obtain the intensity and phase information by illuminating an object with an interferometric superoscillatory field as described above, rather than with coherent light having a plane wavefront.

The interferometric nature of the superoscillatory field allows the retrieval of phase information from intensity measurements at multiple polarisations, as described above. Accordingly, if a superoscillatory wavefront generated by a metasurface is used to illuminate an object, both intensity and phase information can be obtained, and used to wholly or partially reconstruct the object's appearance.

Figure 17:
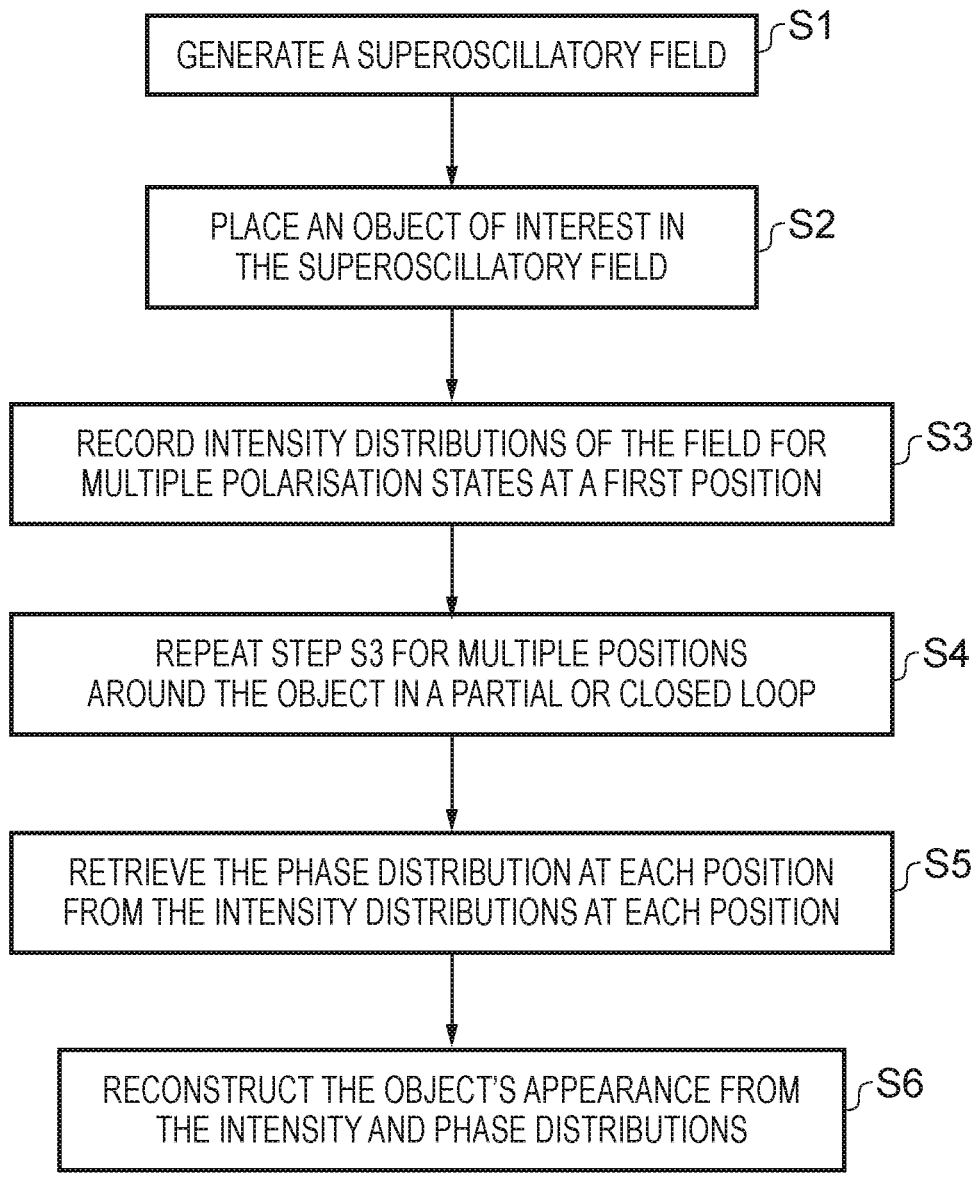
FIG. 17 shows a flow chart of steps in a method for imaging an object using the intensity and phase of a superoscillatory field.

FIG. 17 shows a flow chart of steps in a method to achieve imaging in this way. In step S1, an interferometric superoscillatory field is generated as previously described. In step S2, an object of interest is placed in the superoscillatory field, for example in the focal plane. In step S3, a set of intensity distributions of the scattered field (in one dimension or two dimensions) is recorded for multiple different polarisation states of the incident wave (LCP, RCP and ±45°, as before). In step S4, the intensity measurements of step S3 are repeated at a plurality of positions around the object, where the positions lie on a closed or open curve around the object. In step S5, the phase distribution at each position is retrieved from the set of intensity measurements taken at that position, using equation 1 for example. Then, in step S6, the intensity and phase information is used to reconstruct part or all of the object's appearance (or one or more characteristics therefore, such as size or shape) using backward wave propagation mathematics, for example according to the Kirchhoff-Helmholtz integral. An appropriately programmed computer processor can be provided to implement the backward wave propagation calculations and present a reconstruction of all or part of the imaged object.

In a simpler method, step S4 can be omitted, and the reconstruction can be carried out using intensity and phase from one position only. Measurements from multiple positions can improve the result, however.

Owing to the significantly sub-wavelength sized features of the superoscillatory field, this technique is able to provide super-resolution imaging of the object, compared to the diffraction limit of $\lambda/2$ placed on coherent diffraction imaging and other techniques using plane waves. The resolution is instead determined by the sizes of the zones in the superoscillatory field where the phase of the light changes rapidly (in other words, the size of the phase singularities). Depending on the wavelength used and the quality of the metasurface, it is expected that this resolution can be in the range of $\lambda/100$ to $\lambda/1000$.

The above-described applications for the disclosed methods can be considered to be metrology, in other words measuring or determining the dimensions of objects or features of objects, and two-dimensional or three-dimensional imaging. The metrology application is widely applicable, in particular, to the characterisation of nanoscale objects or objects with nanoscale features, which are otherwise too small to be accurately measured by known optical techniques.

It is proposed that the use of simultaneous multiwavelength illumination could be used to produce colored intensity maps, to be captured with a color camera, for an improved the statistical outcome from neural network processing, and a correspondingly increased measurement. Intensity maps can be captured in transmission or reflection modes, and for some metrology applications, a transmission configuration will be relevant where object information can be recovered from light that has passed through the object. This is applicable, for example, to the measurement of features of semiconductor chips which are located within the chip, requiring measurement through other layers of the object which produce their own scattering. However, modelling experiments for metrology on objects placed behind scattering screens give good results, showing that the proposed techniques are applicable to these and other situations in which the features of interest of the object are obscured by some obstacle. Larger neural network training data sets may be needed, and accuracy may be reduced in some cases. Overall, though, the metrology is applicable to both external and internal features of objects.

It is expected that the rate at which objects can be processed for metrology can be very high. The maximum rate for a given apparatus will depend on the frame rate of the camera or other detection arrangement operating in binning mode. For currently available equipment, this can reach 20 million frames per second. For real time measurements, this will be limited by the information retrieval time of the neural network, and/or other computer processing steps, but could exceed tens of thousands of measurements per second.

The presence of the object alters the superoscillatory field, where the nature of the alteration depends on features of the object. Hence, other applications for the invention are proposed, in which information about a feature can be deduced by a neural network trained with multiple intensity maps recorded from multiple similar objects for each of which one or more pieces of information about the same feature are known. The neural network deduces an estimate for the corresponding information about an unknown object which has been imaged to provide one or more intensity maps for the neural network.

One example can be broadly considered as the detection of a particular feature or features in an object, so that objects can be classified according to the presence or absence of that feature. More specifically, this can be employed for defect detection, for example in manufacturing processes in which it is necessary to test individual items during or after manufacture to ensure they comply with quality requirements or match the intended design or specification. The presence of certain defects may cause diffraction effects which modify the intensity map of the object, and a neural network can therefore pick such objects out of a stream of objects as needing rejection or repair.

In this context, it is proposed that defect detection or failure analysis be used to identify topography imperfections in the etalon (unspooled) semiconductor chip structure, since these imperfections can alter the intensity map available from the chip. A suitable training set for the neural network may comprise a large number of intensity maps recorded from an etalon chip structure to which topography defects are artificially added at random but known locations. Physical training sets with implanted defects can be manufactured by recording diffraction patterns from real wafers containing a large number of chips, where defects could be introduced by focused ion beam milling or other techniques. In some simple cases virtual training sets which are adequately matched to the real detection apparatus may be generated by computer modelling. The object's feature of interest, typically on the nanoscale, is the defect, with the chip being characterized by the absence or presence of a defect, and the position of any defect which is present, defined for example by x and y coordinates, or other spatial coordinates. The presence of a defect changes the intensity map compared to that from a defect-free chip, and the shape of the intensity distribution will depend on the position of the defect on the chip. After training, the neural network will be able to identify both the presence of an otherwise unseen defect, and the position of that defect in the structure. To achieve this, information recovered from the intensity distribution will be positional information for a defect, such as its x and y coordinates, for any intensity map from which a defect is recognised. From the training, the neural network will be able to firstly distinguish the intensity map (using the intensity distribution and/or the phase distribution) of a chip with a defect from the map of a chip with no defect, and in the former case, retrieve the defect position. This information can then be used to characterise a chip as defective or not, with additionally the defect location being assigned to the chip where a defect is found. As the chips pass through the detection apparatus, the superoscillatory field can be directed onto areas of the chip which are known to be most vulnerable to defect formation. This will alert the chip manufacturing process, and will indicate a potential problem with a particular section of the chip. The manufacturing process can then be corrected.

This is similarly applicable to defect detection in other items in which the presence of a small or nanoscale defect modifies the diffraction pattern.

A further application is that of particle counting, for example for nanoscale particles which are otherwise too small to be counted via conventional microscopy techniques. A particular example is the counting of contaminant, pollen and carbon particles, or virus and bacteria particles, used for example in disease testing and diagnosis wherein a biological sample such as a blood sample is taken from a patient and cultured in order to allow any pathogens to multiple. The result of counting the resulting number of particles can then be used to determine if the patient has a disease. Counting can be particularly difficult in the case of viruses, which typically have sizes ranging form 5 nm to 300 nm, and are about ten times smaller than bacteria. Commonly, an electron microscope will be used for virus counting. However, the high level of sub-wavelength resolution available from the presently proposed methods makes it highly suitable for this application.

In order to achieve counting, a sample may be scanned across small areas, and the number of particles in each area counted, and totaled together to give a total particle count for all or part of a sample. The presence of a particle within the sample will modify the intensity distribution of a superoscillatory field into which the sample is placed. Accordingly, a particle can be detected from its effect on the intensity map. More particles will further modify the intensity map, which is also dependent on the position of the particles.

Hence, a suitable object for characterisation via examples of the current method is a group of particles, within a small region of a sample such as might contain up to ten particles or up to twenty particles. The intensity map will vary according to the number of particles and their positions within the sample region. Hence, a suitable neural network training set can be based on a plurality of sample regions, each with a random number of randomly positioned particles within it. Each sample region is characterized by its particle count value (number of particles in the group of particles present in the region), regardless of the position of the particles. Therefore, the training set provided to the neural network comprises one or more intensity maps of each sample region, together with the particle count value for that sample region. After training, the neural network is able to distinguish between intensity maps corresponding to different particle count values.

To conduct particle counting, therefore, a sample can be divided into nominal regions, and scanned through a superoscillatory imaging apparatus in order to produce an intensity map for each region. The intensity maps (as intensity and/or phase distributions) are suppled to the neural network, which recovers, from the distribution(s) for each region, information in the form of a particle count value. The sample region is then characterised by having the value assigned to it to indicate the number of particles it contains. Values from multiple regions across the sample can be summed together to provide a total particle count for the sample or part thereof.

Particle counting may be extended or modified to enable particle classification, that is, determining the likely class or type of a particle. In particular, particles may be differently sized and/or differently shaped, or made from different materials, and this will have an effect on the intensity map produced by a sample containing such particles. In this case, the training data set used to train the neural network can comprise one or more intensity maps for each sample region plus values for the particle count value for each size or other type of particle size in the sample region. That is, the number of large particles 24a, the number of medium particles 24b and the number of small particles 24c. Of course, this can be modified to apply to more or fewer particle sizes, depending on the nature of the samples to be classified. Alternatively, sample regions may include particles of one size only, with regions containing different particle sizes. Similarly, differently shaped particles may be included as well as or instead of differently sized particles, or particles which differ by other ways that affect the diffraction pattern. Larger training sets will be appropriate as the range of particle variety increases, in order to maintain accuracy.

To conduct particle classification, therefore, a sample can be divided into nominal regions, and scanned through the imaging apparatus in order to create at least one intensity map for each region. The intensity maps are suppled to the neural network, which recovers, from each intensity and/or phase distribution, information that includes the likely size (or other class/type information) of particles in the region (and may include particle count also). The sample region is then characterised by having the particle information assigned to it to indicate the type or types (class) of particles it contains.

As well as the improved resolution available from these imaging techniques using superoscillatory fields, apparatus suitable for implementing the imaging is amenable to significant miniaturisation compared with existing imaging systems that require bulk optical components. The metasurface may have dimensions of about 40 µm by 40 µm, as already noted, although smaller or larger metasurfaces are not precluded. This allows a metasurface to be mounted on the end surface of an optical fibre. Also, there is no need for the vacuum conditions required by electron microscopes.

Figure 18:
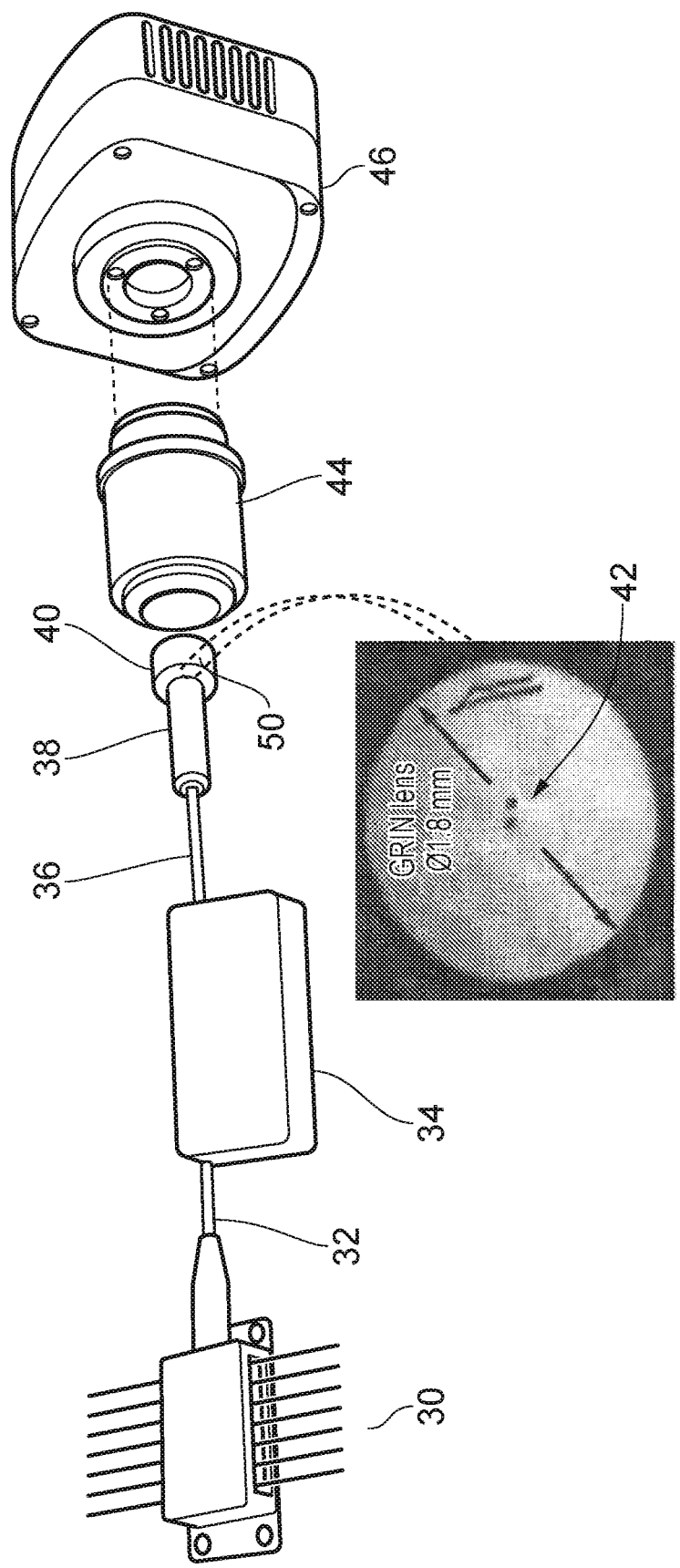
FIG. 18 shows a perspective side view of example apparatus suitable for generating and measuring a superoscillatory field for use in imaging methods described herein.

FIG. 18 shows a perspective view of an apparatus configured to generate, and obtain intensity distributions of, a superoscillatory field which is suitable for use in aspects of the present invention. A laser diode 30 can be used to generate a planar coherent incident beam, with its output coupled into an optical fibre 32. The optical fibre 32 delivers the beam to a polarisation controller 34 configured to switch the incident beam between different polarisation states such as the four states needed for phase retrieval. The polarisation controller can be omitted if phase information is not of interest. The beam output by the polarisation controller 34 is carried by a further length of optical fibre 36 to a portion of graded index optical fibre 38 (GRIN fibre) which focuses the beam onto a metasurface 42 provided on the end surface of a further portion of GRIN fibre 40 of larger diameter (such as 1.8 mm). This GRIN fibre delivers the superoscillatory field formed by the metasurface to a location 50 where the object of interest (training object or unknown object, for example) can be placed into the superoscillatory field. A lens arrangement 44 (comprising one or more lenses) collects and magnifies the wavefront of the field and projects it to a CCD array 46 for detection of the intensity distribution. A polariser (not shown) may be interposed somewhere between metasurface 42 and the detector 46 in order to select the polarisation component of interest, such as the y component discussed above.

The apparatus of FIG. 18 is merely an example, and the various components can be configured and embodied in any way apparent to the skilled person.

Additionally, superoscillatory fields for use in the imaging approaches described herein need not be generated using the metasurfaces described thus far. In particular, imaging that utilises a neural network can be carried out using intensity information only, with no requirement for phase information. Accordingly, non-interferometric superoscillatory fields (in other words, a straightforward superoscillatory field rather than the product of interference between a straightforward superoscillatory field and a plane wave reference field such as is generated inherently by a metasurface) can be employed in such cases. Also, metasurfaces other than those described herein may be used. Other superoscillatory field generators include ring nanostructures, structured dielectric surfaces and spatial light modulators (SLMs). Any other superoscillatory field generators of which the skilled person is aware may also be used.

Also, the imaging methods are not limited to optical wavelengths (typically visible light with wavelengths from about 400 nm to 700 nm, plus infrared and ultraviolet light, covering a total wavelength range from about 100 nm (near ultraviolet) to about 100 μm (mid and far infrared). Electromagnetic radiation of other wavelengths may alternatively be used, from microwaves (typically with wavelengths from about 1 mm to 1 m) to x-rays and extreme ultraviolet (typically with wavelengths from about 0.01 nm to 100 nm). Furthermore, the same principles can be implemented with electron beams and acoustic waves; the techniques are not limited to electromagnetic radiation.

In addition to the greatly enhanced resolution achievable by the various proposed imaging methods, superoscillatory imaging is attractive compared to technologies such as STED which require luminescent or fluorescent markers to be attached to objects to be imaged. Superoscillatory imaging requires no such markers so is label-free, and hence also more widely applicable since it can be applied to objects which cannot readily be labelled.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] Z Bomzon, G Biener, V Kleiner, E Hasman, "Space-variant Pancharatnam-Berry phase optical elements with computer generated subwavelength gratings", Opt. Lett. 27, 1141-1143 (2012)

[2] D Lin, P Fan, E Hasman, M L Brongersma, "Dielectric gradient metasurface optical elements", Science 345, 298-302 (2014)

[3] U.S. Pat. No. 9,606,415

[4] E T F Rogers and N I Zheludev, "Optical super-oscillations: sub-wavelength light focusing and super-resolution imaging", J. Opt. 15, 094008 (2013)

[5] K S Rogers, K N Bourdakos, G H Yuan, S Mahajan, E T F Rogers, "Optimising superoscillatory spots for far-field super-resolution imaging", Opt. Express 26(7), 8085-8112 (2018)

[6] G H Yuan, S Vezzoli, C Altuzarra, E T F Rogers, C Soci, N I Zheludev, "Quantum super-oscillation of a single photon", Light Sci. Appl. 5, e16127 (2016)

[7] E T F Rogers, J Lindberg, T Roy, S Savo, J E Chad, M R Dennis, N I Zheludev, "A super-oscillatory lens optical microscope for subwavelength imaging", Nat. Mater. 11, 432 (2012)

[8] G H Yuan, E T F Rogers, N I Zheludev, "'Plasmonics' in free space: observation of giant wavevectors, vortices and energy backflow in superoscillatory optical fields", Light Sci. Appl. 8, 2 (2019)

[9] H N Chapman and K A Nugent, "Coherent lensless X-ray imaging", DOI: 10.1038/nphoton.2010.240

[10] G J Williams, H M Quiney, BB Dhal, C Q Tran, K A Nugent, A G Peele, D Paterson, M D de Jonge, "Fresnel coherent diffractive imaging", Phys. Rev. Lett. 97, 025506 (2006)

The invention claimed is:

1. A method of imaging comprising:
generating a superoscillatory field from coherent electromagnetic radiation;
placing an object in the superoscillatory field;
detecting one or more intensity distributions of the superoscillatory field scattered by the object; and
determining at least one characteristic of the object from the one or more intensity distributions;
in which generating the superoscillatory field comprises passing the coherent electromagnetic radiation through a nanostructured metasurface; and
in which the nanostructured metasurface is configured to generate an interferometric superoscillatory field comprising interference between a plane wave and a superoscillatory field.

2. A method according to claim 1, in which the coherent electromagnetic radiation is optical radiation, and the object is dimensioned on the nanoscale.

3. A method according to claim 1, in which the determining comprises providing the one or more intensity distributions to a neural network trained with intensity distributions of the superoscillatory field scattered by other objects, and allowing the neural network to deduce one or more characteristics of the object.

4. A method according to claim 3, in which the detecting comprises detecting a plurality of intensity distributions corresponding to different positions of the object in the superoscillatory field.

5. A method according to claim 3, further comprising, prior to the placing:
positioning a first object with one or more known characteristics in the superoscillatory field;
recording at least one intensity distribution of the superoscillatory field scattered by the first object;
repeating the positioning and recording for a plurality of further objects with known characteristics;
providing the recorded intensity distributions to a neural network; and
training the neural network to deduce characteristics of an unknown object using the recorded intensity distributions.

6. A method according to claim 3, further comprising, prior to the placing:
generating by computer processing a plurality of intensity distributions of the superoscillatory field scattered by plurality of computer-generated objects with known characteristics;
providing the computer-generated intensity distributions to a neural network; and
training the neural network to deduce characteristics of an unknown object using the computer-generated intensity distributions.

7. A method according to claim 1, in which:
the detecting comprises:
detecting at a first position relative to the object a plurality of intensity distributions of the superoscillatory field scattered by the object, each intensity distribution being for a different polarisation state of the coherent electromagnetic radiation; and
optionally detecting further corresponding pluralities of intensity distributions at further positions relative to the object, such that the first position and the further positions lie on a closed or open curve or surface around the object;
and
the determining comprises:
retrieving a phase distribution of the superoscillatory field at each of the first position and any further positions from the plurality of intensity distributions at that position; and
using the intensity distributions and the phase distributions to determine a reconstruction of at least part of the object by backward wave propagation.

8. A method according to claim 7, in which the different polarisation states comprise a left circular polarisation, a right circular polarisation, and two orthogonal linear polarisations.

9. A method according to claim 1, in which the at least one characteristic of the object comprises one or more of size, shape, orientation, position, movement, appearance, composition, spacing, presence or absence of a defect, position of a defect, a number of particles comprised in the object, a type of particle comprised in the object, and a material from which the object is made.

10. An apparatus configured to implement a method according to claim 1.

11. An apparatus for imaging an object comprising:
a superoscillatory field generator configured to generate a superoscillatory field;
a detector configured to detect an intensity distribution of the superoscillatory field; and
a processor configured to receive intensity distributions, detected by the detector, of the superoscillatory field scattered by an object placed in the superoscillatory field, and determine at least one characteristic of the object from one or more of the intensity distributions;
in which the superoscillatory field generator comprises an optical source operable to output a beam of coherent optical radiation, and a nanostructured metasurface through which the beam of coherent optical radiation is passed in order to generate a superoscillatory field; and
in which the nanostructured metasurface is configured to generate an interferometric superoscillatory field comprising interference between a plane wave and a superoscillatory field.

12. An apparatus according to claim 11, in which the processor is comprised in a computer system storing a neural network trained with intensity distributions of the superoscillatory field scattered by other objects and operable to deduce one or more characteristics of the object.

13. An apparatus according to claim 11, in which:
the superoscillatory field generator comprises a polarisation controller configured to select a polarisation state of coherent electromagnetic radiation from which the superoscillatory field is generated; and
the processor is further configured to retrieve a phase distribution of the scattered superoscillatory field from a plurality of intensity distributions detected for different polarisation states, and to determine the at least one characteristic by using intensity distributions and phase distributions for at least one position on a closed or open curve or surface around an object in the superoscillatory field in backward wave propagation calculations.

14. A non-transitory storage medium storing software comprising a computer program configured to:
receive, for one or more positions of an object placed in a superoscillatory field, a plurality of detected intensity distributions of the superoscillatory field scattered by the object, each intensity distribution being for a different polarisation state of coherent electromagnetic radiation from which the superoscillatory field is generated, the superoscillatory field being generated by passing the coherent electromagnetic radiation through a nanostructured metasurface configured to generate an interferometric superoscillatory field comprising interference between a plane wave and a superoscillatory field;
retrieve a phase distribution of the scattered superoscillatory field from the or each plurality of detected intensity distributions; and
determine a reconstruction of at least part of the object from the detected intensity distributions and retrieved phase distributions.

* * * * *